Dec. 11, 1951  R. G. TRIGGS  2,577,933
MEASURING AND FILLING MACHINE
Filed Aug. 31, 1948  15 Sheets-Sheet 1

Inventor:
Ronald George Triggs
By Thiess, Olsen & Mecklenburger
Attys

Dec. 11, 1951     R. G. TRIGGS     2,577,933
MEASURING AND FILLING MACHINE
Filed Aug. 31, 1948     15 Sheets-Sheet 3

INVENTOR.
Ronald George Triggs.
BY
Thiess, Olson & Mecklenburger.
Attys.

Dec. 11, 1951 R. G. TRIGGS 2,577,933
MEASURING AND FILLING MACHINE
Filed Aug. 31, 1948 15 Sheets-Sheet 4
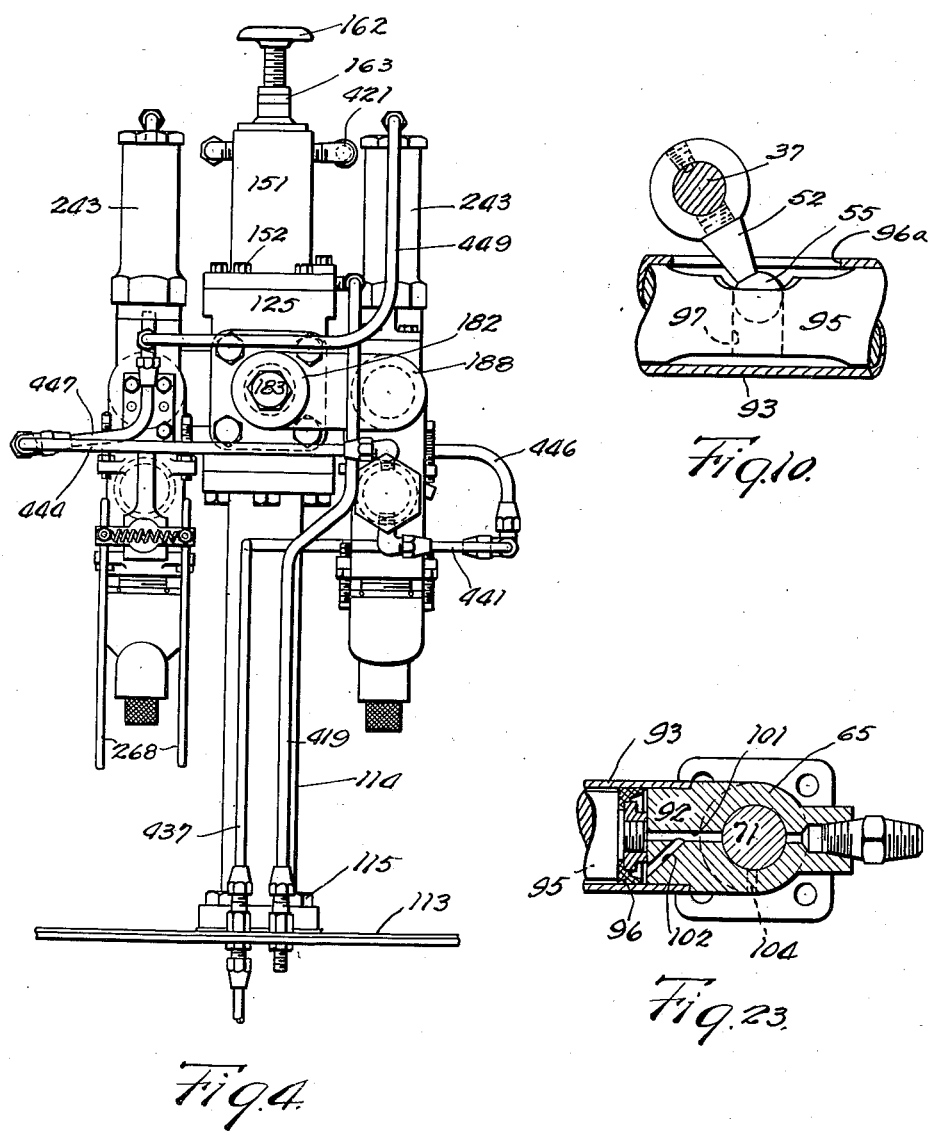
INVENTOR.
Ronald George Triggs.
BY
Thiess, Olson & Mecklenburger.
Attys.

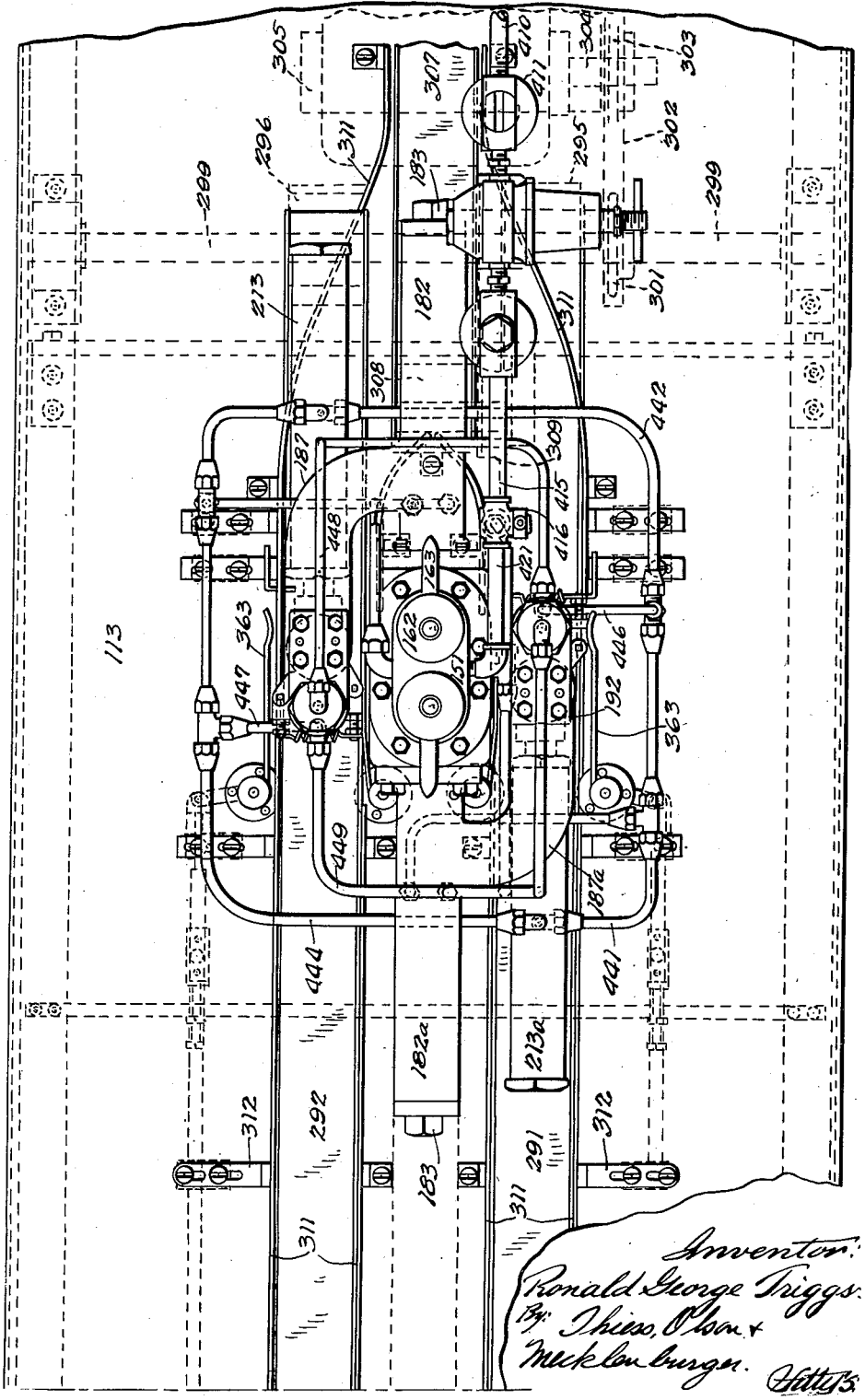

Dec. 11, 1951    R. G. TRIGGS    2,577,933
MEASURING AND FILLING MACHINE
Filed Aug. 31, 1948    15 Sheets-Sheet 6

Inventor:
Ronald George Triggs.

Dec. 11, 1951     R. G. TRIGGS     2,577,933
MEASURING AND FILLING MACHINE
Filed Aug. 31, 1948     15 Sheets-Sheet 7
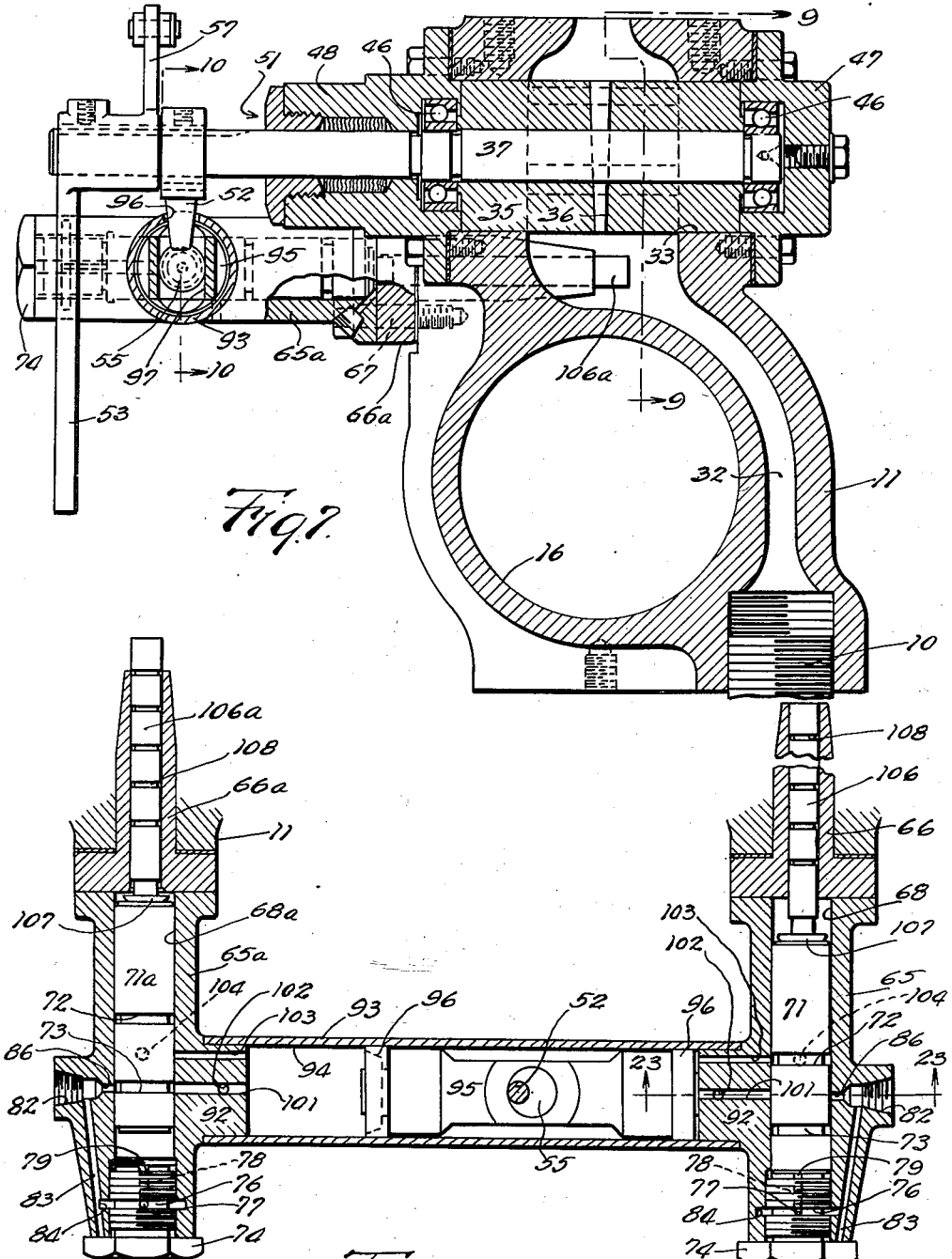

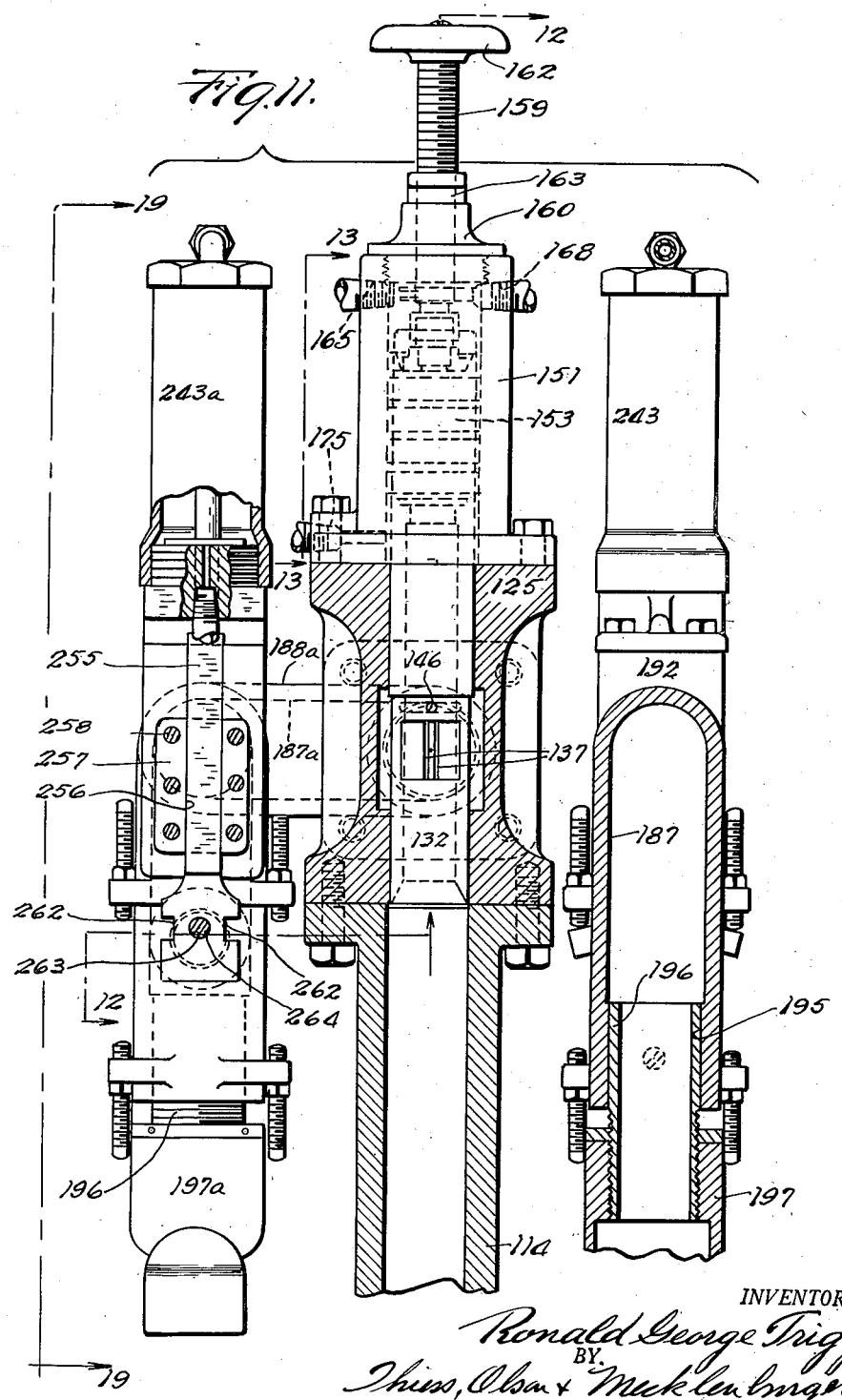

Dec. 11, 1951  R. G. TRIGGS  2,577,933
MEASURING AND FILLING MACHINE
Filed Aug. 31, 1948  15 Sheets-Sheet 9

INVENTOR.
Ronald George Triggs.
BY
Thiess, Olson & Mecklenburger
Attys.

Dec. 11, 1951  R. G. TRIGGS  2,577,933
MEASURING AND FILLING MACHINE
Filed Aug. 31, 1948  15 Sheets-Sheet 10
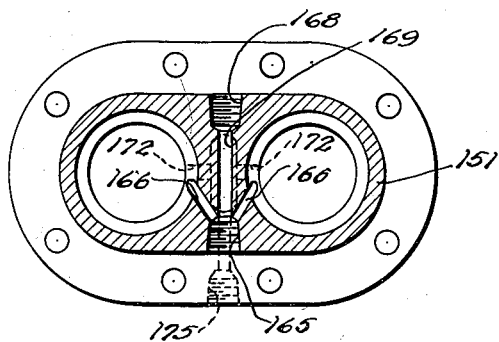
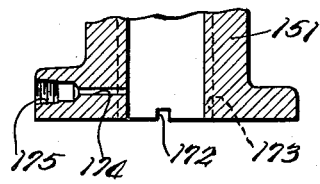
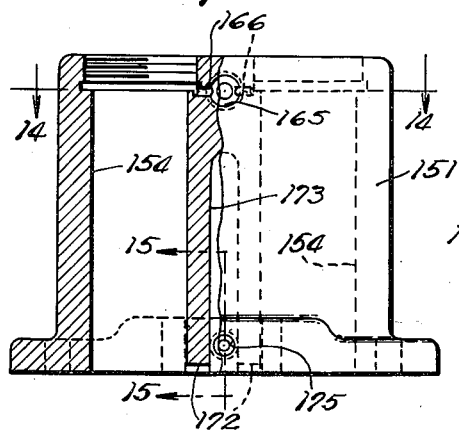
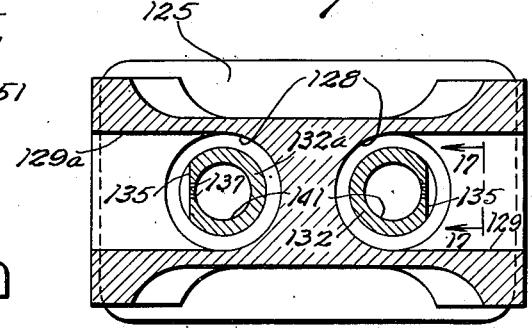
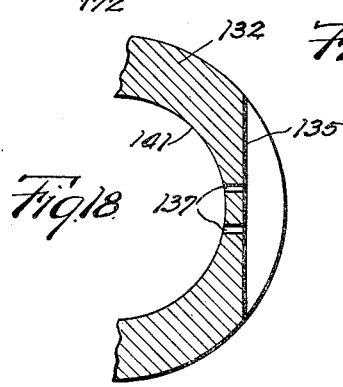
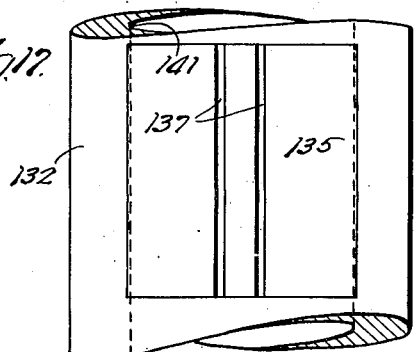
INVENTOR.
Ronald George Triggs.
BY
Thiess, Olson & Mecklenburger
Attys.

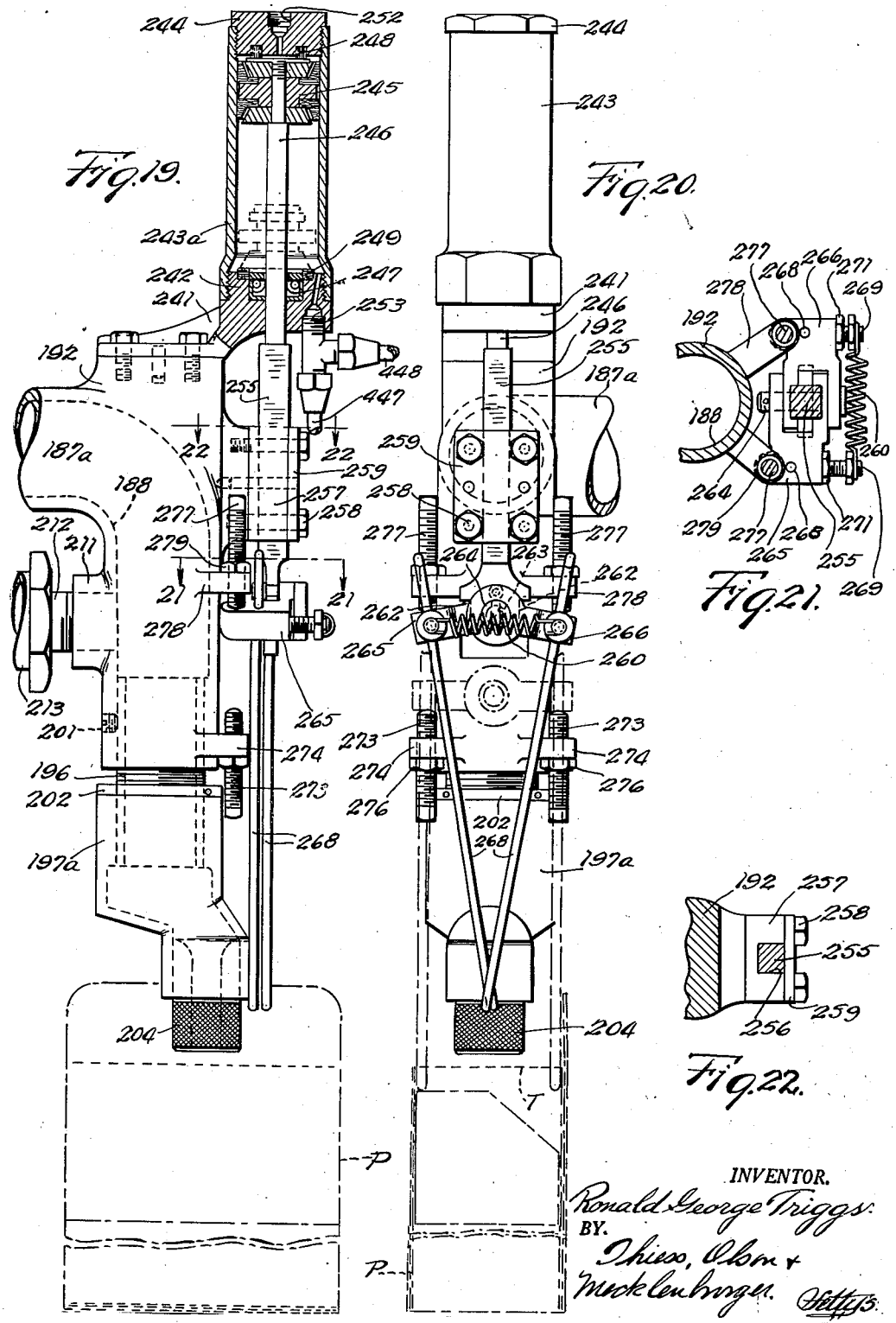

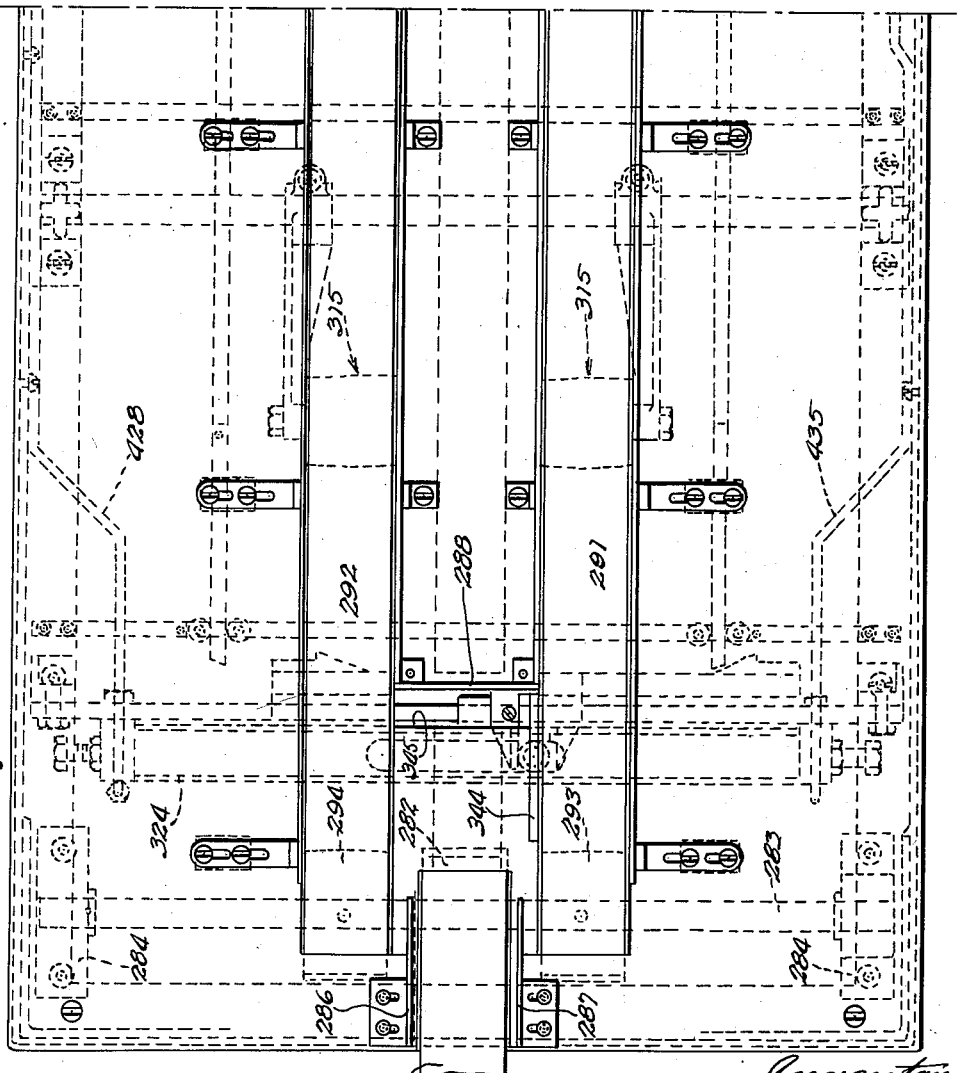

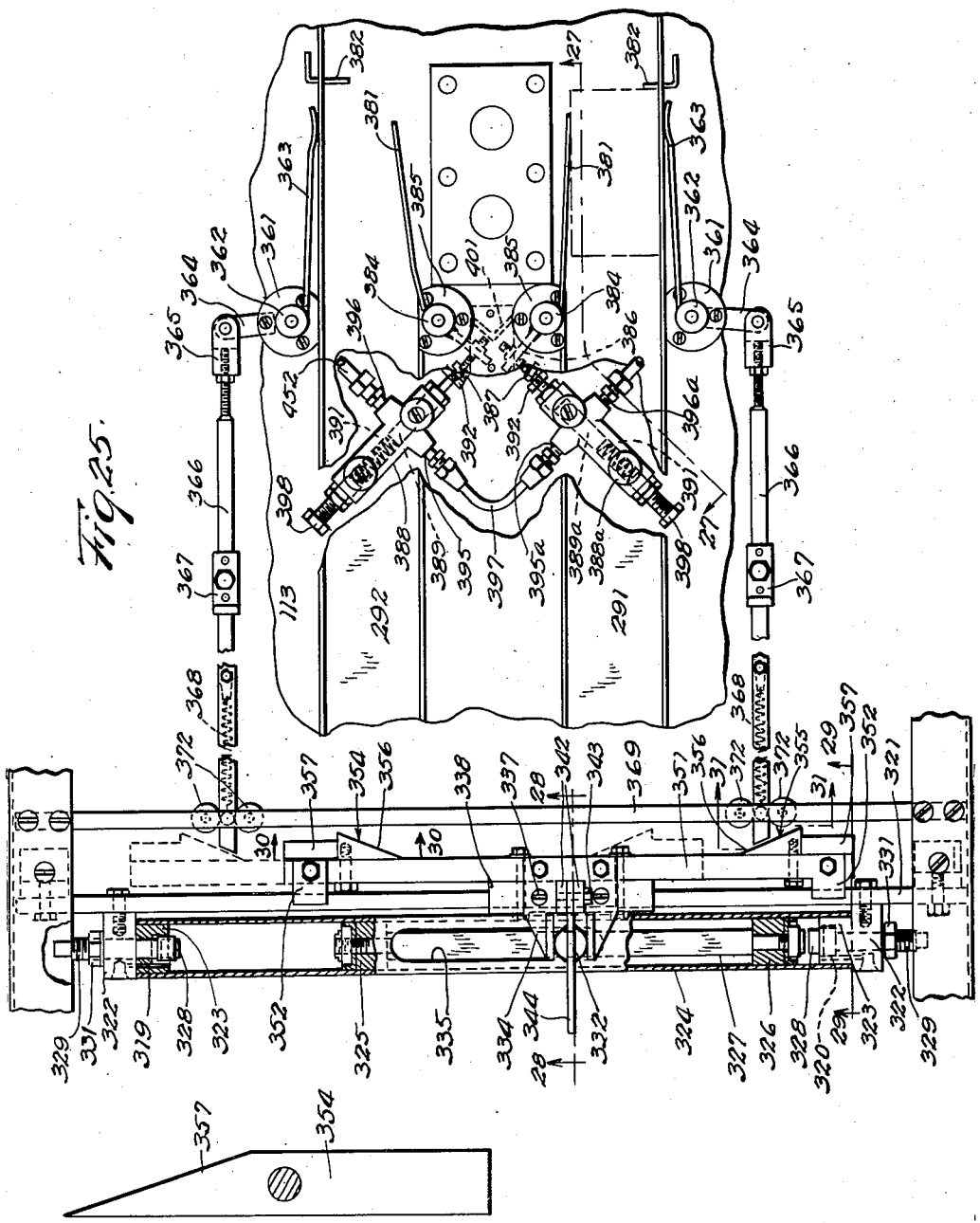

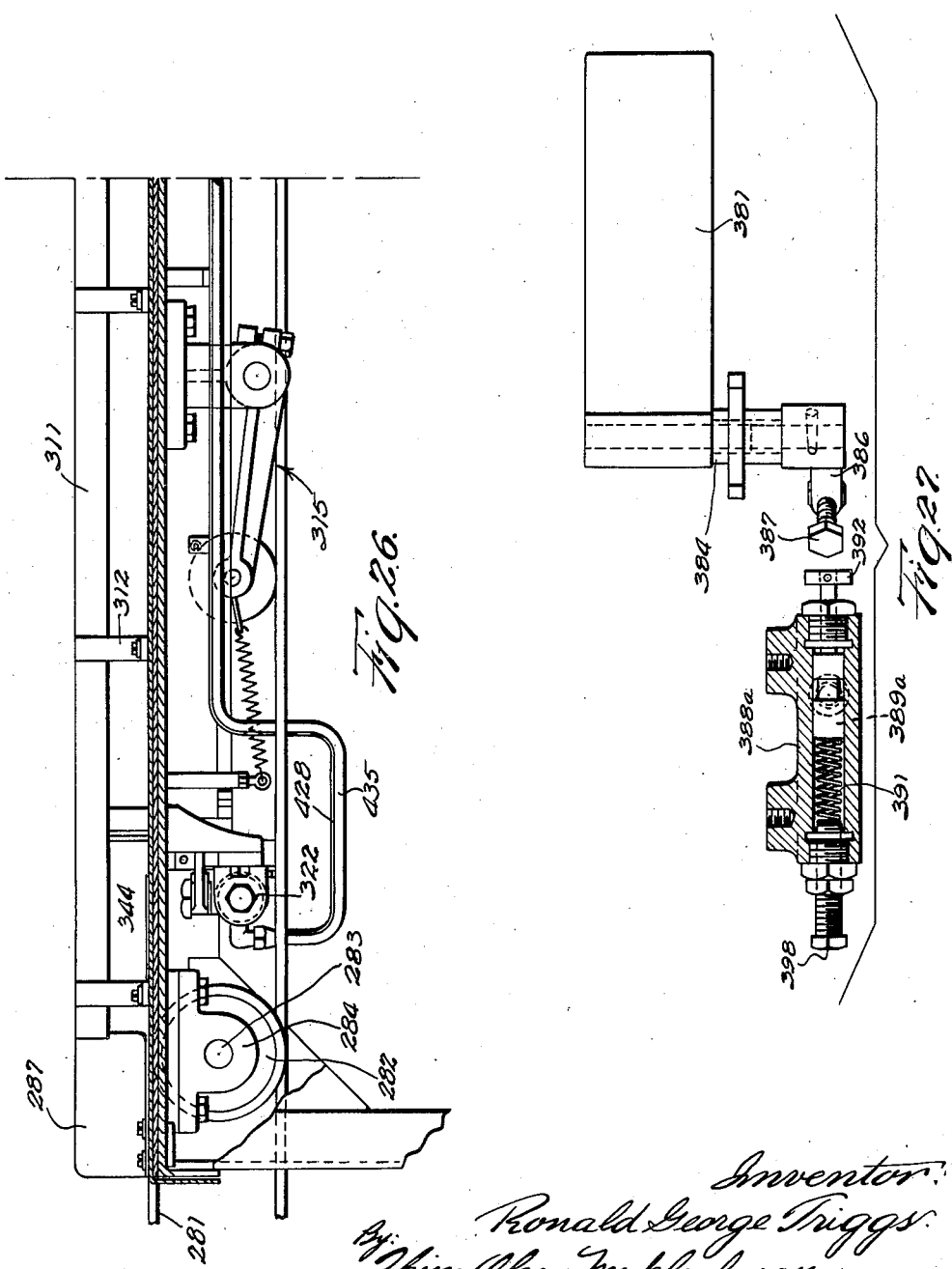

Dec. 11, 1951 R. G. TRIGGS 2,577,933
MEASURING AND FILLING MACHINE
Filed Aug. 31, 1948 15 Sheets-Sheet 15
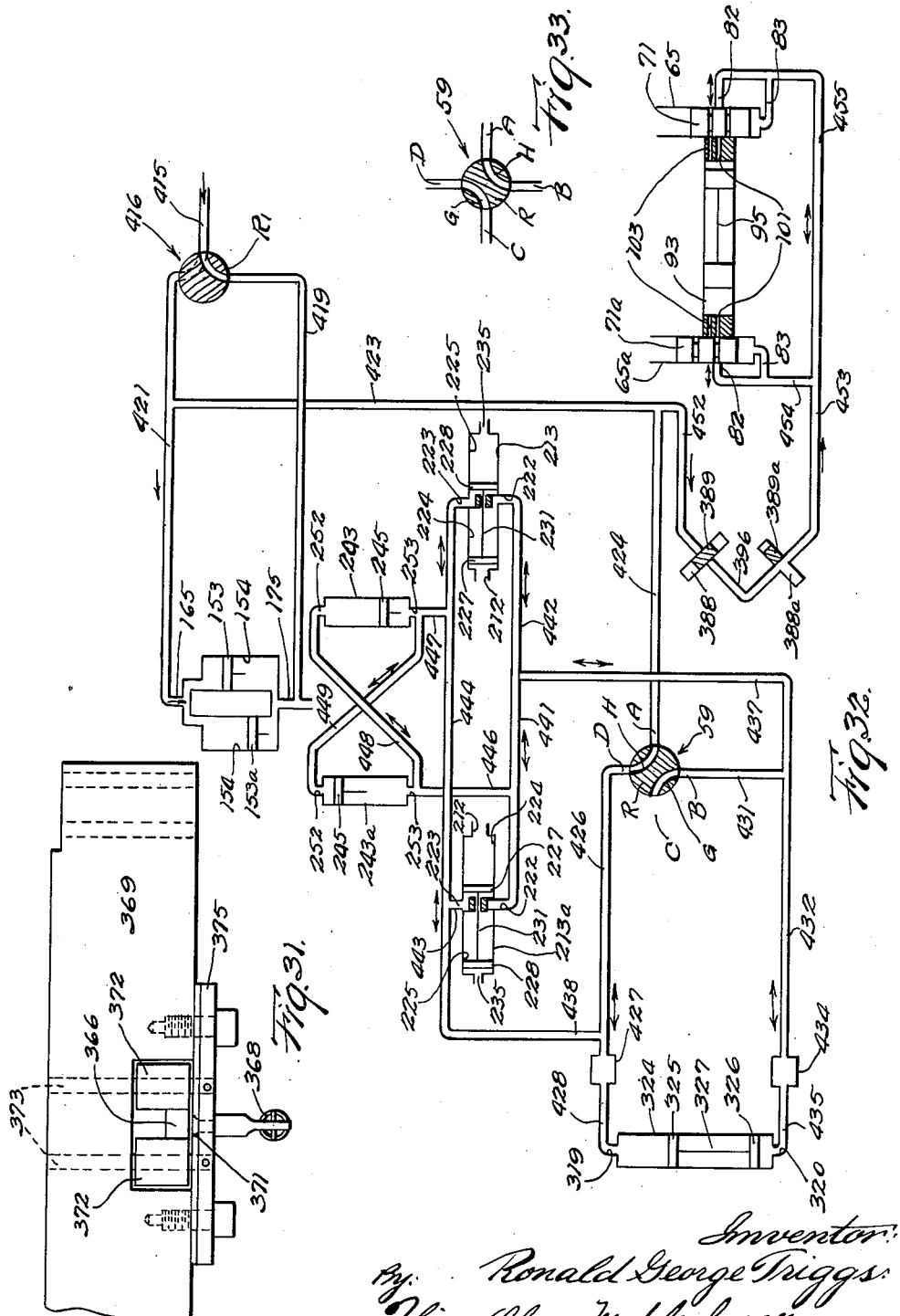
Inventor:
Ronald George Triggs
By Thiess, Olson & Mecklenburger Attys.

Patented Dec. 11, 1951

2,577,933

UNITED STATES PATENT OFFICE 2,577,933

MEASURING AND FILLING MACHINE

Ronald George Triggs, Chicago, Ill., assignor to The Globe Company, Chicago, Ill., a corporation of Illinois Application August 31, 1948, Serial No. 47,073

15 Claims. (Cl. 226—107)

The present invention relates to a measuring and filling machine for viscous materials and has special reference to a machine for measuring a predetermined weight, i. e. volume, of viscous or semi-liquid material, for example, lard or vegetable shortening, into a package.

In order that a measuring and filling machine have maximum efficiency, it is highly desirable to provide mechanism which will take advantage of the time elapsed between the filling of one package and the filling of the next, there being an interval during which the filled package is removed from beneath the spout of the machine and is replaced by an empty container. By providing a duplex mechanism, each half of which is operated alternately, a container on one side may be filled while the next empty container is being brought into position on the other side. Then, by using common means for supplying the material to the two filling spouts, these may be served alternately with a simple arrangement of parts.

The present invention is directed to such a duplex type of machine. It comprises a product-measuring cylinder having a double-acting piston for supplying identical measured quantities from opposite ends of the cylinder as the piston reciprocates therein.

The material being handled is supplied to the cylinder under substantial pressure, which may be on the order of 400 pounds per square inch. A supply conduit connects the source of material to a valve which in turn is connected by a pair of conduits to the opposite ends of the measuring cylinder. A pair of discharge passages also connects the valve to a pair of discharge nozzles positioned one on each side of the machine.

A four-way main control valve is preferably employed, being arranged to alternately connect the supply conduit to one of the conduits leading to an end of the cylinder and the conduit at the opposite end of the cylinder to one of the discharge passages.

The material, due to the pressure thereon, is fed into one end of the cylinder, forcing the piston toward the opposite end to thereby discharge the material, then in the opposite end of the cylinder through the discharge passage connected thereto.

Accordingly, as the main control valve is moved from one position to the other, the material automatically flows into and out of the opposite ends of the cylinder, being discharged alternately from the nozzles on each side of the machine. The pressure of the material actuates the piston whenever the valve setting is changed.

The present machine is automatic throughout and is controlled by a compressed air system, including various valves and pistons, synchronized with the operation of the main control valve. The compressed air system through suitable mechanism controls the actuation of the main control valve in accordance with the change in pressure in the conduits leading to the ends of the measuring cylinder. The movement of the piston forces the material alternately through the discharge nozzles and into the containers supplied therebelow by conveyor belts. However, automatic means are provided for rendering the machine inoperative to discharge material whenever a package is not in filling position below a nozzle.

Automatically operating means maintain the closing flaps of the containers, as well as any liners when they are employed, out of the path of the material supplied to the carton. Such means are synchronized with the main control valve so as to operate when a package is in position below the nozzle associated therewith and just prior to the discharge of material from the nozzle. As soon as a predetermined charge of material has been forced from the nozzle, automatic suction means synchronized with the main control valve is actuated to prevent any dripping from the nozzle. The movement of the cartons from filling position is likewise synchronized with the operation of the main control valve.

The machine is provided with adjusting mechanism for varying the volume of the material being fed and for correlating density and volume of a specific product in order to dispense proper weight thereof upon each operation.

It is to an automatically operating machine of this general type that the present invention is directed.

An object of the present invention is to provide an automatically operating measuring and filling machine for accurately supplying a predetermined charge of material to a container.

Another object of this invention is to provide such a machine which may be controlled in its operation by a compressed air system.

Still another object is to provide a machine of the above type which is automatically operated by the pressure of the material supplied thereto and the compressed air system of the machine.

A still further object is to provide a machine having a measuring cylinder with a piston therein and a main control valve which is caused to be actuated in accordance with the pressure of the material supplied to and discharged from opposite ends of the cylinder.

Another object of the present invention is to provide a machine which will be rendered ineffective to discharge material when no carton is positioned in filling position.

A still further object is to provide such a machine having a no-drip arrangement for preventing dripping of the material after a predetermined charge has been discharged from a nozzle.

An additional object of the present invention is to provide means for moving the filled cartons from filling position so that they may be conveyed from the machine.

Still another object is to provide a machine of the type above indicated which shall be automatic throughout and in which the various parts are synchronized to function in timed relation with the main control valve.

Other objects and advantages will be apparent from the following description and claims when considered with the accompanying drawings in which latter:

Fig. 4 is a partial left end elevational view of the upper part of the machine;

Fig. 5 is a partial plan view of the machine;

Fig. 7 is a cross-sectional view taken substantially on the line 7—7 of Fig. 1;

Fig. 8 is a cross-sectional view taken on the line 8—8 of Fig. 1;

Fig. 9 is a detail cross section taken on the line 9—9 of Fig. 7;

Fig. 10 is a cross-sectional detail taken on the line 10—10 of Fig. 7;

Fig. 11 is a detailed end elevation of one of the filling spouts, the homogenizing means and other parts associated therewith, with certain parts shown in section;

Fig. 13 is a detail view, partly in section taken on the line 13—13 of Fig. 11;

Fig. 14 is a cross section taken on the line 14—14 of Fig. 13;

Fig. 15 is a cross section taken on the line 15—15 of Fig. 13;

Fig. 16 is a cross section taken on the line 16—16 of Fig. 12;

Fig. 17 is a detail view, somewhat enlarged, looking in the direction of the arrows 17—17 of Fig. 16 and showing one of the homogenizing nozzles;

Fig. 18 is a somewhat enlarged cross-sectional detail of the nozzle of Fig. 17;

Fig. 19 is a front elevational view in detail as seen on the line 19—19 of Fig. 11, and with a carton in position for filling;

Fig. 20 is a right end elevational view of that part of the structure shown in Fig. 19;

Fig. 21 is a cross-sectional detail taken on the line 21—21 of Fig. 19;

Fig. 22 is a cross-sectional detail taken on the line 22—22 of Fig. 19;

Fig. 23 is a cross-sectional detail taken on the line 23—23 of Fig. 8;

Fig. 24 is a plan view of substantially the left half of the table top of the machine;

Fig. 25 is a detail in plan of the carton-switching mechanism and of the interlock for interrupting the fluid feed in the absence of a carton below the discharge nozzle;

Fig. 26 is a front elevation showing certain parts of Fig. 25;

Fig. 27 is a view in detail taken on the line 27—27 of Fig. 25;

Fig. 30 is a detailed cross section taken on the line 30—30 of Fig. 25;

Fig. 31 is a detail view looking in the direction of the arrows 31—31 of Fig. 25;

Fig. 32 is a diagrammatic layout of the pneumatic system of the machine; and

Fig. 33 is a diagram of the four-way measuring piston switching valve.

Figure 1:
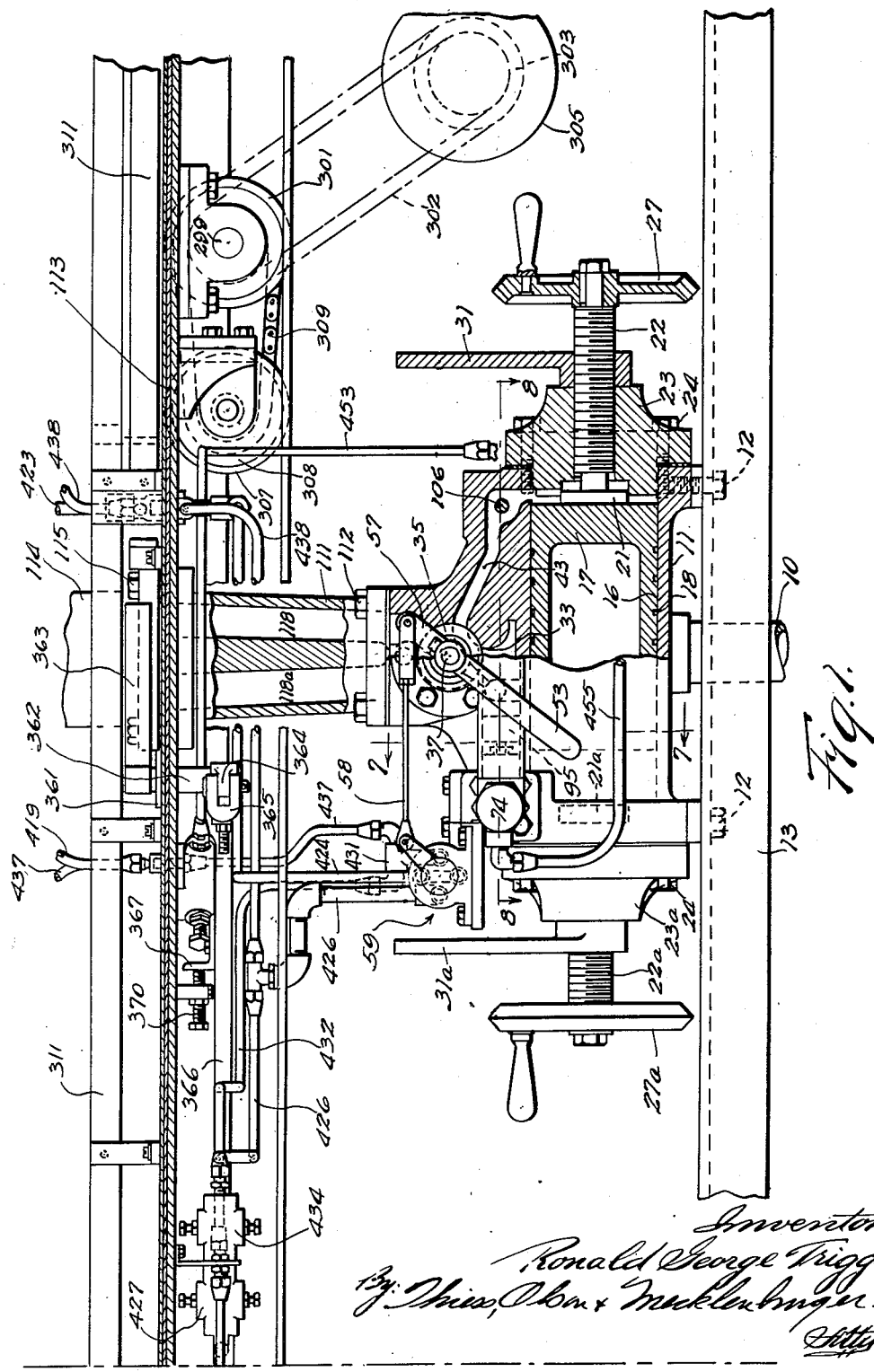
Fig. 1 is a partial front elevational view of the lower part of the machine with certain portions in vertical cross section.

Referring more particularly to the drawings, there is shown a measuring and filling machine embodying the present invention intended for processing fluid or semi-fluid materials of various kinds, such, for example, as shortening in the form of lard or a vegetable compound.

Such material is commonly packaged in one-pound cardboard containers having foldable flaps and a cover of the type illustrated in the drawings. However, the machine may feed the material processed to containers formed of any suitable material and of any desired shape, whether or not a foldable liner is employed therewith.

Figure 3:
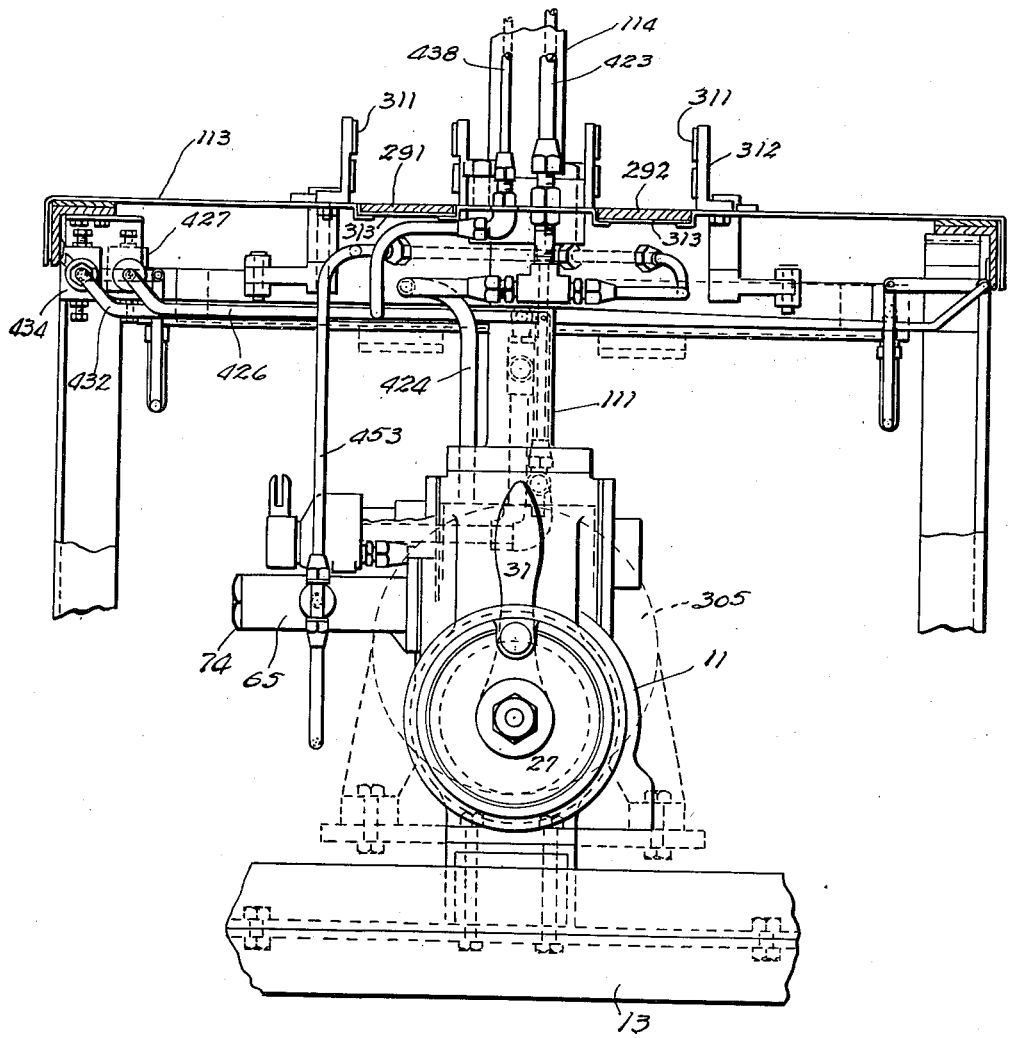
Fig. 3 is a partial right end elevational view of the lower part of the machine.
Figure 28:
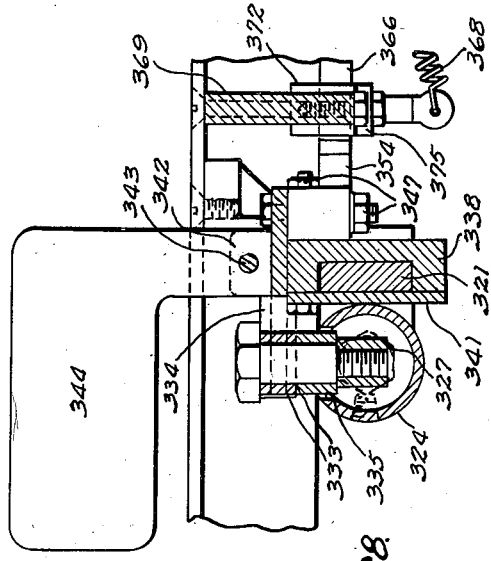
Fig. 28 is a cross-sectional detail view taken on the line 28—28 of Fig. 25.
Figure 29:
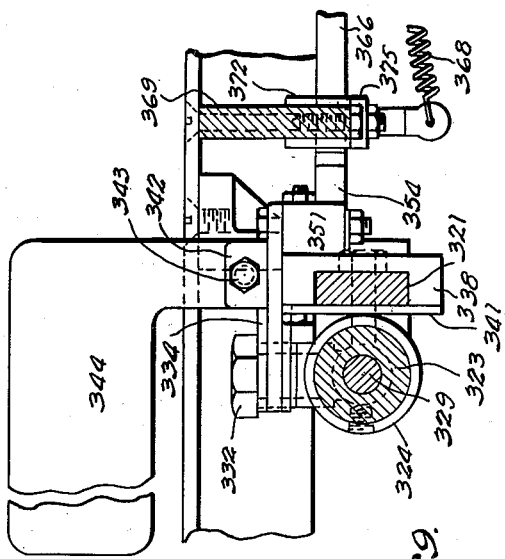
Fig. 29 is a cross-sectional detail view taken on the line 29—29 of Fig. 25.
Figure 6:
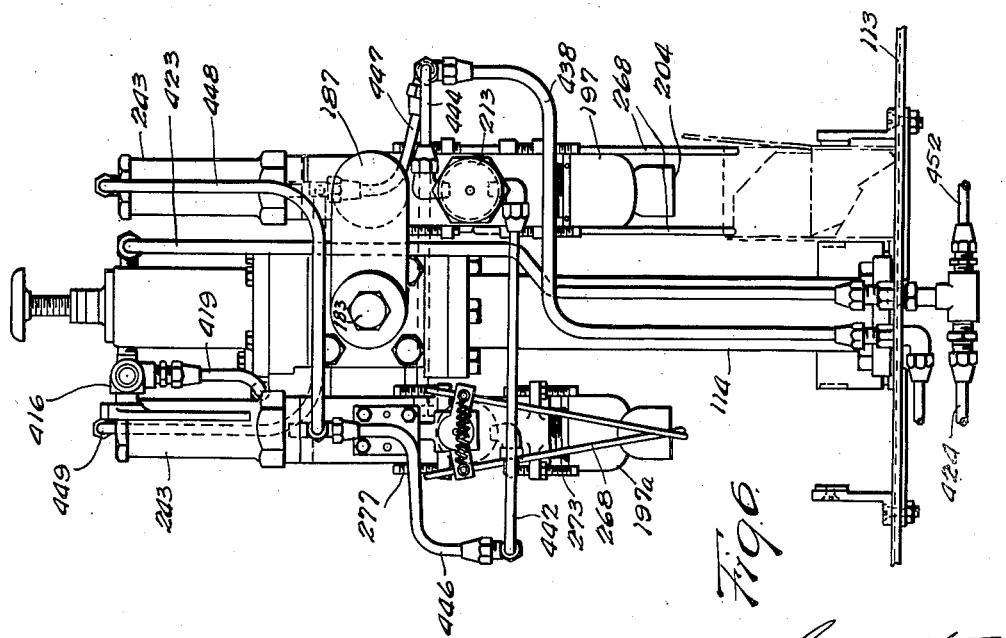
Fig. 6 is a view similar to Fig. 4 but looking from the right hand end of the machine.

The portion of the machine initially receiving the material to be processed is shown in Figs. 1, 3 and 7. The material is fed under pressure in viscous form from a pump through a pipe 10. If necessary, the product is heated to permit it to flow without undue frictional losses. Pipe 10 enters a product-measuring cylinder 11 and is secured by screws 12 to the lower frame members 13.

Cylinder 11 is preferably a casting having a central opening 16 within which a snugly-fitting free piston 17 is adapted to slide under pressure of the product being delivered to the machine. Such pressure is maintained by a suitable pump (not shown) and may, for lard, be on the order of 400 pounds per square inch. Sealing of one face of the piston with respect to the other is augmented by peripheral grooves 18.

Movement of the piston 17 from one position to another is limited by a pair of adjustable stop buttons 21, 21a, each formed on the inner end of the adjusting screws 22, 22a threadedly engaged in the heads 23, 23a secured to the ends of the cylinder 11 by screws 24. Hand wheels 27, 27a secured to the screws 22 and 22a respectively may be employed for moving the buttons 21 and 21a axially to alter the range of movement of the piston 17 in either direction. Very precise adjustment of piston travel may be achieved by reason of the screws 22 and 22a, and the setting then accurately maintained by locking levers 31 and 31a threaded on the screws 22 and 22a and abutting the heads 23 and 23a.

The flow of material from the pipe 10 to the opening 16 of the cylinder 11 is by means of channel 32 (Fig. 7) cast into the cylinder wall and communicating with a valve chamber 33. The latter is cylindrical in form and snugly receives the rotary valve body 35 keyed as at 36 to a valve shaft or stem 37. Body 35 is cored as best seen in Fig. 9 to provide a pair of arcuate passages 41 and 42. Fluid communication between valve body 35 and the respective ends of the cylinder opening 16 is furnished by a pair of channels 43 and 43a also preferably integrally cast into the cylinder.

The valve shaft 37 is rotatably supported in bearings 46 carried in fixed caps 47 and 48, the latter including a conventional stuffing box 51. At its forward end the shaft 37 has a rocker arm 52 secured thereto and additionally a hand lever 53, the latter two parts being keyed and setscrewed in the usual fashion. As shown in Fig. 10, the arm 52 is provided with a spherical end 55 for a purpose to be detailed.

Turning again to Fig. 1, the lever 53 has an upward extension 57 to which is pivotally connected the link 58, the opposite end of the link being connected to the operating handle of a four-way valve 59 supported in any convenient manner on the cylinder 11. Valve 59 is of a common type and will be best understood from the diagram of Fig. 33 wherein the rotor is indicated at R and the four ports of the valve at A, B, C and D. Rotor R has two channels G and H and is shiftable between two positions 90° apart.

Shifting of the valve rotor R may be accomplished manually by the handle 53 or automatically in timed sequence by pneumatic means. Referring to Figs. 7, 8 and 23, such means, described herein as an air control, comprises a pair of control cylinders 65 and 65a secured together with a pair of pilot cylinders 66 and 66a to the cylinder 11 by screws 67. Cylinders 65 and 65a each include a bore 68 and 68a within which pistons 71 and 71a are adapted to slide, the latter each having a pair of peripheral channels 72 and 73, and being limited forwardly in stroke by abutment with the screwed plugs 74. Each of the plugs 74 has a peripheral groove 76 in communication with a port 77 diametrically through the plug, in turn in communication with axial port 78. A diametrically positioned channel 79 across the inner face of plugs 74 is also in communication with port 78.

Air is admitted to plugs 74 and hence to the face of pistons 71 and 71a by means of the openings 82, passages 83 and circular grooves 84 in alignment with the grooves 76. The openings 82 also continue into the passages 86, adapted to be placed into fluid communication with grooves 73 upon reciprocation of pistons 71 and 71a rearwardly of the machine, as shown at the left in Fig. 8.

Rigidly secured to bosses 92 extending laterally from cylinders 65 and 65a is a tube 93 defining a cylinder opening 94 within which a double-ended piston 95 is adapted to slide. Resilient washers 96 (Fig. 23) seal the piston in the opening 94. As seen best in Fig. 10 the cylinder 93 is slotted at 96a to receive the rocker arm 52 and the spherical end 55 thereof is in engagement with the piston 95 by virtue of a slot 97 therein.

Each boss 92 has an axial bore 101 and a diagonal bore 102 (Fig. 23) providing an air passage between the passage 86 and cylinder opening 94 when groove 73 is in rearward position. A further pair of passages 103 in the bosses 92 provide communication between ports 104 (Fig. 23) and cylinder opening 94 via channels 72.

Pilot cylinders 66 and 66a slidably receive the pilot pistons 106 and 106a, each having a head 107 adapted to abut the pistons 71 and 71a. Grooves 108 in the periphery of the pistons 106 and 106a provide sealing as is understood in the art. It will be observed that the rearward end of each piston 106 and 106a protrudes respectively into passages 43 and 43a of the cylinder 11, the latter being best seen in Figs. 1 and 7.

Delivery of the measured product from the cylinder opening 16 to the upper part of the machine and thence to the discharge spouts is through a coupling 111 (Fig. 1) attached at its lower end to the top of cylinder 11 by screws 112 and at its upper end to the table top 113 and to a hollow post 114 by screws 115. The coupling 111 has a pair of passages 118 and 118a in communication with the passages 119 and 119a in the cylinder 11 (Fig. 9).

Figure 2:
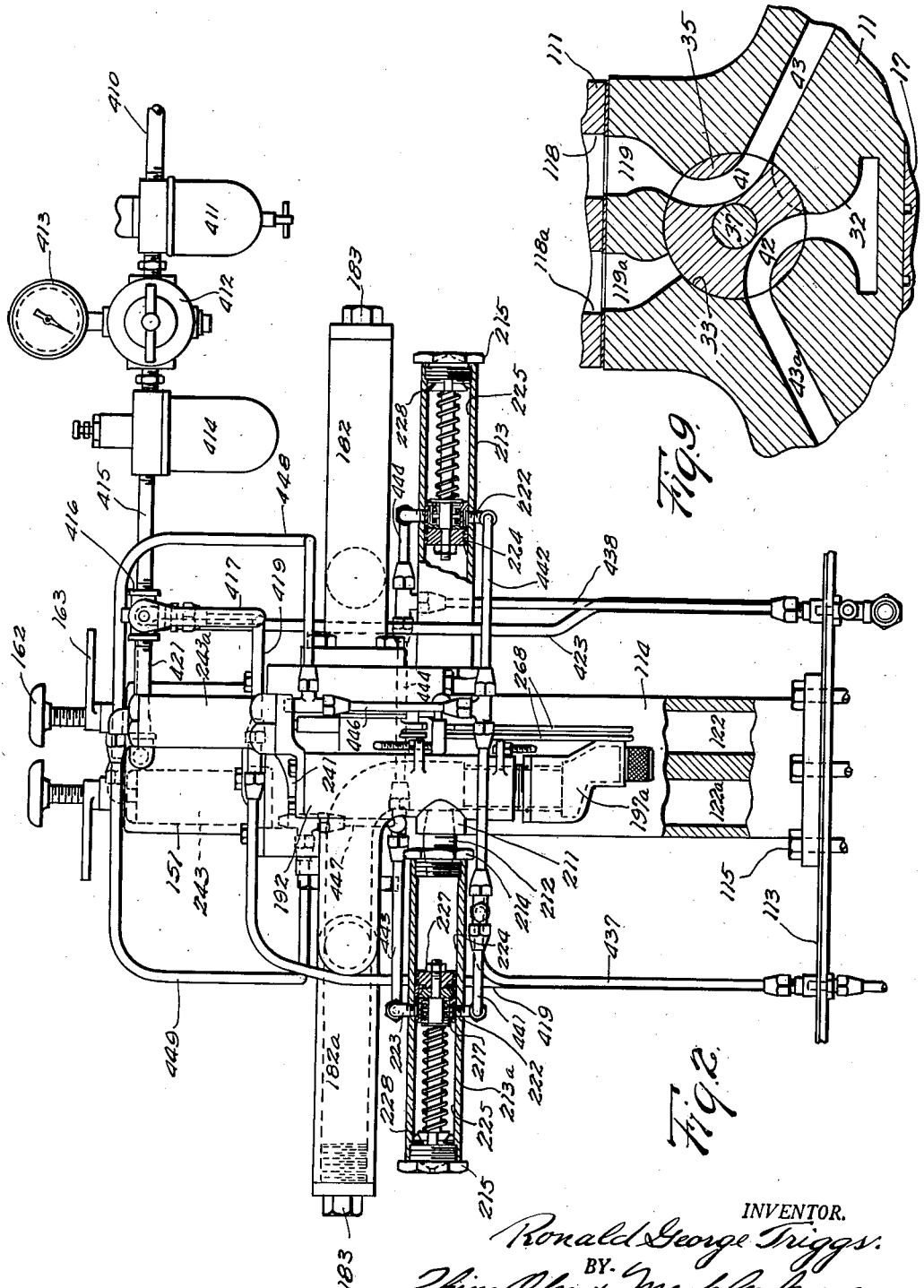
Fig. 2 is a partial front elevational view of the upper portion of the machine forming in substance a continuation of Fig. 1.
Figure 12:
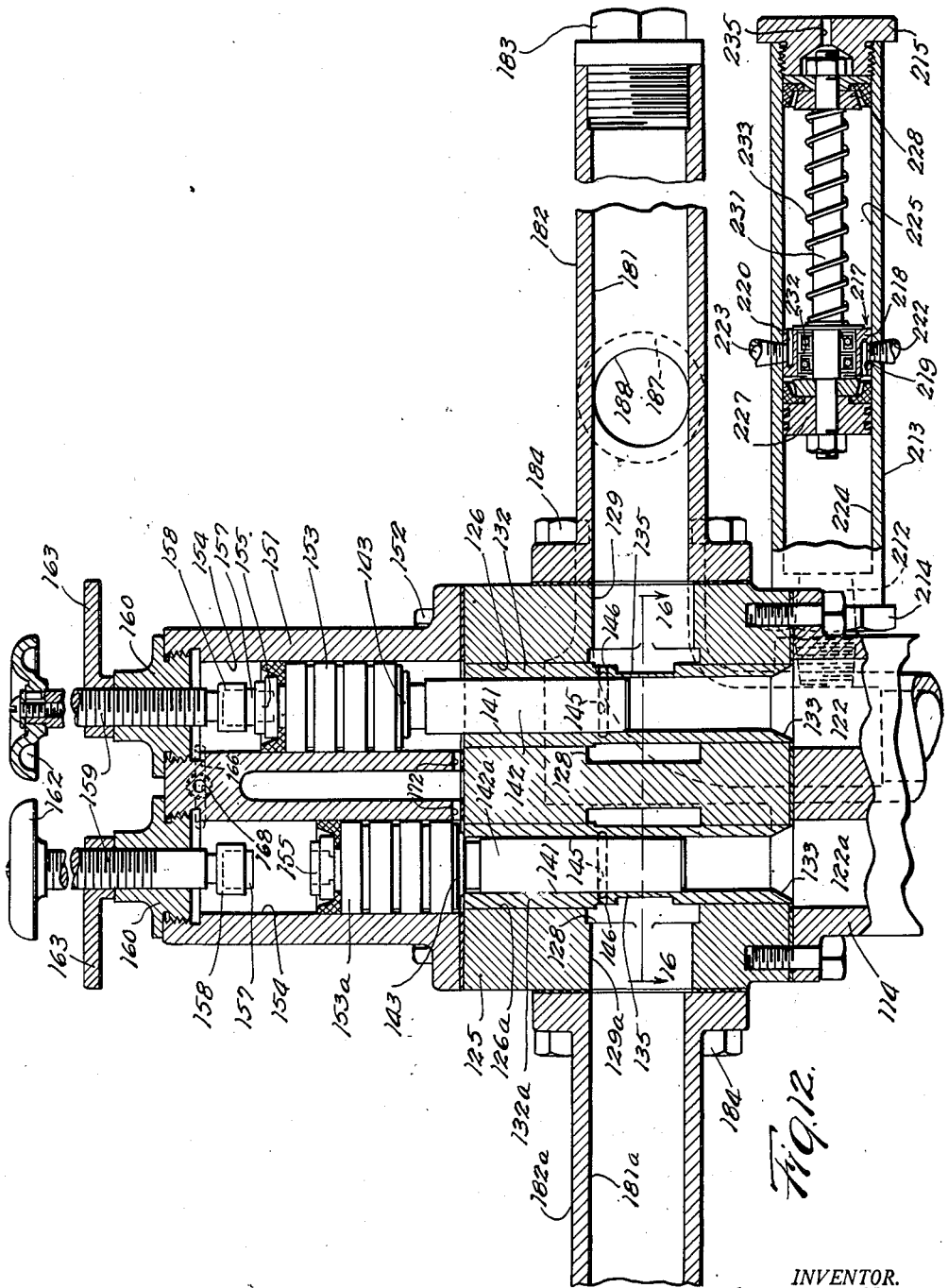
Fig. 12 is a cross-sectional view taken substantially on the line 12—12 of Fig. 11.

Post 114 is likewise dually channeled at 122 and 122a to mate with channels 118 and 118a (Fig. 2). Referring now to Fig. 12, the post 114 is surmounted by a body or casing 125 having a pair of parallel, vertically disposed apertures 126 and 126a in alignment respectively with channels 122 and 122a, the apertures being enlarged at their mid-zones as at 128 and interconnected with laterally disposed openings 129 and 129a (Fig. 16) directed respectively toward the right and left ends of the machine. Into each aperture 126 and 126a is tightly pressed a sleeve 132 and 132a chamfered at the lower end as at 133 to reduce fluid friction and, in the region of the enlargements 128 provided with homogenizing nozzles.

Turning to Figs. 16, 17 and 18, these nozzles are formed by first providing a flat face 135 on the sleeves 132, 132a and then slitting the resulting thinned-out walls in these sleeves to provide pairs of parallel slots 137.

Arranged to slide in the apertures 141 of the sleeves 132 and 132a are the plungers 142 and 142a each having a head 143. In the event the product below the plungers 142, 142a has a tendency to be forced past the plungers 142, 142a there are provided in the bores 141 channels 145 in communication with holes 146 opening to the discharge side of the slots 137.

The plungers 142 and 142a are driven upwardly by the pressure of the product being forced into the sleeves 132 and 132a and are positively returned by pneumatic means. Such means are carried in a housing 151 (Fig. 12) secured to the casing 125 by screws 152. Pistons 153, 153a are slidable within bores 154 of the housing and have the customary sealing grooves and packing shown. Each piston is adapted to abut its individual plunger 142 or 142a through the medium of the heads 143, and is provided with a pad 155 arranged to strike a resilient bumper 157 carried in a socket 158 at the end of a threaded stem 159. The latter are threadedly supported in caps 160 threaded in housing 151. The stems 159 are each provided with a handle 162 and a locking handle 163 whereby the position of the bumpers 157 may be varied to fix the upper limit of travel of the pistons 153, 153a, and hence of the plungers 142, 142a.

Air from a source of supply is admitted to cylinder openings 154 through port 165 communicating therewith through conduits 166, or through port 168 in communication with port 165 through passage 169 (Fig. 14). Exhaust from the opening 154 is via grooves 172 (Figs. 12 and 15), cavity 173, passage 174 and port 175.

After being forced through the homogenizing slots 137 the product is permitted to expand into elongated chambers 181 and 181a defined by cylindrical casings 182 and 182a (Fig. 12) and closed by screwed plugs 183. The casings 182 are secured to the body 125 by screws 184, the chambers 181 being in alignment respectively with the openings 129 and 129a. Opening off the chambers 181 are the hollow right angled arms 187 and 187a defining passages 188 and 188a (Figs. 5 and 12).

Inasmuch as the arms 187 and 187a are similar in construction and function, only one and its cooperative parts will be detailed. Turning to Figs. 12, 19 and 20, the arm 187a leads into a nozzle-supporting body 192, the arm forming a support therefor. Passage 188 continues downwardly to the lower end of the body 192 and is smooth bored at 195 to receive the nozzle sleeve 196 (Fig. 11) threaded at its lower end to adjustably receive a correspondingly threaded part of the nozzles 197 and 197a. Set screws 201 secure the sleeves 196 with respect to the bodies 192. Lock nuts 202 fix any adjusted position of the nozzles 197 or 197a. To reduce the size of the stream of discharging product, a nozzle piece 204 is threaded into each of the nozzles 197 and 197a, insertion or removal thereof being facilitated by the knurled periphery shown.

Following the discharge of a measured amount of the product into a package it is desirable to achieve a sharp cut-off of the stream being emitted from the nozzle piece 204, for otherwise, there would be dripping from the nozzle and a consequent messy condition of the machine and of the packages. I accomplish this object by novel means now to be described, and for convenience referred to as the "no-drip" feature.

Fitted into a boss 211 at each side of each body 192 (Figs. 2 and 12) is a nipple 212 which supports one of the dual cylinders 213 and 213a. Each end of the cylinder is provided with a screwed cap 214, 215, the former being apertured for connection with the nipple 212. At its center each cylinder 213, 213a is partitioned by a member 217 comprising an annular supporting ring 218 having a pair of axially positioned blind holes 219 and 220 in communication respectively with air fittings 222 and 223. Within the two compartments 224 and 225 of the cylinder 213 a double headed piston is arranged to operate, one head, 227, working within the innermost compartment 224, and the other, 228, in the outermost compartment 225. A piston rod 231 secures the two pistons for point reciprocation, the packing 232 within the member 217 sealing one compartment with respect to the other. A compression spring 233 interposed between member 217 and piston 228 biases the double piston always outwardly. Exhaust from compartment 225 is permitted through a passage 235 in the cap 215.

When the pistons 227 and 228 are moved outwardly, a suction is created in the inner end of the cylinder which causes the material in the adjacent spout to be sucked therein, thereby preventing dripping. As hereinafter explained in detail, the compressed air system of the machine controls the movement of the piston in the cylinders 213 to cause actuation of the no-drip mechanism as soon as a change of material has been delivered from its associated spout.

In order to maintain the cover flaps and tissue liner of a carton fully open during the filling operation there is provided what will be sometimes hereinafter termed a "spreader," and best shown in Figs. 19 through 22. Secured to a suitable pad at the top of the body 192 is a bracket 241 including a circular threaded boss 242 to which a cylinder 243 is attached. A screwed bushing 244 closes the upper end of the cylinder 243. Within the cylinder a piston 245 is adapted to reciprocate the piston rod 246 extending exteriorly of the cylinder through packing 247. Annular bumpers 248 and 249 absorb shock upon reciprocation in either direction. Admission and exhaust of air for the double-acting piston 245 is by way of ports 252 and 253 in the bushing 244 and boss 242 respectively.

Piston rod 246 continues exteriorly of the boss 242 in a square guiding portion 255 arranged for sliding in a channel 256 (Fig. 22) of block 257. Screws 258 secure a cover plate 259 and block 257 to the body 192. At its lower end the portion 255 is enlarged and has two lateral notches 262 (Fig. 11). Through an aperture 263 of the portion 255 a pin 264 is passed and receives a pair of swingable bifurcated arms 265 and 266 (Fig. 21). To each arm is secured a rod 268, there being a screw 269 and locknut 271 for the purpose. A tension spring 260 spread between screws 269 constantly biases the arms 265 and 266, and hence the rods 268, to the closed position shown in Fig. 20.

Rods 268 are adapted to be operated, while in closed position, downwardly until the lower ends of the rods are intermediate the flaps of the carton and the upstanding sides of the tissue liner. At this juncture it must be explained that a conventional one-pound lard carton, for example, is closed by two short end flaps and an overlying full sized flap having a foldable tuck-in portion, while a tissue lining for the same, would, before being folded over the product, have four upstanding sides. To insure that these sides as well as the carton flaps are out of the way of the stream of product, the rods 268, after being lowered, are opened whereby the tissue liner is spread apart and the long flap and short end flaps of the carton are also held open.

Accordingly, the rods 268 are forced to open position by the two arms 265 and 266 striking a pair of adjustable lower stop screws 273 threaded into lugs 274 of the body 192 and secured in selected position by locknuts 276. Proper closing of the rods 268 is attained by the provision of adjustable upper stop screws 277 carried in lugs 278 of body 192, also equipped with locknuts 279. It will be noted that rods 268 are offset, as seen in Fig. 19, so that neither one strikes the other, with obviously unsatisfactory functioning.

The empty containers are brought to the machine in any convenient way, but in any event are shown as arriving at the left hand side thereof on a conveyor belt 281 (Figs. 24 and 26) carried on a pulley 282 secured to a shaft 283 journalled in bearings 284 bolted to the underside of the table 113. Upstanding guide plates 286 and 287 adjustably secured to the table top prevent the containers from becoming dislodged from the belt.

After the cartons are thrown from the belt 281 they come to rest successively against a stop rail 288, from which position they are switched alternately to one or the other of the conveyor belts 291 or 292 running on pulleys 293 or 294, the belts traversing substantially the full length of the machine table and being carried around similar pulleys 295 and 296 at the far end of the table. Pulleys 293 and 294 are also mounted on shaft 283, the latter deriving power through the belts from pulleys 295 and 296 (Fig. 5). A shaft 299 mounted similarly to the shaft 283 carries a sprocket 301 driven by a chain 302 from sprocket 303 keyed to the output shaft 304 of a motor driven speed reducer 305 mounted below the table in any convenient manner (Figs. 1 and 3).

After being filled, the packages from both sides of the machine exit on a discharge belt 307 passing over a pulley 308 which is driven by a chain drive 309 from shaft 299. To retain the cartons on the belts 291 and 292, guide rails 311 are provided, these being supported on adjustable brackets 312 on the table top 113. (It will be noted that the rails 311 curve inwardly at the right hand end of the machine (Fig. 5) in order to guide the filled cartons properly onto the belt 307.) The belts 281, 291, 292 and 307 lie on metal plates 313, for example, as shown in Fig. 3. Tension is applied to belts 291 and 292 by a pair of idler pulley assemblies of a common type indicated generally at 315 (Figs. 24 and 26), and since forming no principal part of the invention, are not described further.

Switching of the empty cartons alternately from belt 281 to either of belts 291 and 292 is accomplished automatically by pneumatic means now to be described. Referring particularly to Figs. 25, 26, 28 and 29, a cross bar 321 supported at both ends on the framework of the machine, as shown, carries a pair of brackets 322 each including a cylindrical boss 323 over which is pressed a cylinder 324. Reciprocable therein is a pair of pistons 325 and 326 united by a rod 327. The latter is of square cross section except at its ends where the pistons are secured. Adjustable bumpers 328 carried in threaded studs 329 absorb the shock of the pistons 325 and 326. Locknuts 331 serve the customary purpose. Admission and exhaust of air behind piston 325 is through a port 319, and behind piston 326 through a port 320.

At the mid-point of the piston rod 327 there is secured a shoulder screw 332 (Fig. 28) carrying rollers 333 engaged intermediate the furcations of the arm 334. The upper roller reduces friction in so far as arm 334 is concerned and the lower one is adapted to reduce friction in so far as the slot 335 is concerned, the latter being cut into the wall of the cylinder 324.

Arm 334 is attached to a U-shaped slide block 338 reciprocable horizontally on the bar 321, a cover plate 341 serving to secure the block on the bar. Upstanding ears 342 on the arm 334 define a slot within which there is secured by means of a screw 343 a blade 344. The latter (Fig. 24) extends upwardly through the table top 113 and is free to reciprocate between the belts 291 and 292, a clearance opening 345 being provided therefor.

Clamped to both block 338 and arm 334 by bolts 347 is a rectangular bar 351 extending substantially the depth of the machine and provided with blocks 352 slidably bearing on guide bar 321. Fastened adjacent each end of the bar 351 are cam blocks 354 and 355 each having two sloping surfaces 356 and 357 (Figs. 25 and 30). It will be understood that blocks 354 and 355 are mirror counterparts of each other.

Pivotally mounted in bearings 361—361 secured to the table top (Figs. 1 and 25) are bell crank members 362 including a blade 363 and an arm 364. A clevis 365 connects the arm 364 to the operating bar 366, each bar being in operative relation with its individual cam block 354 or 355. A spring 368 secured intermediate the bar 366 and a support 369 urges the bar 366 to the left. Support 369 is carried upon the frame of the machine as clearly shown in Fig. 25. Reciprocation of the bars 366 is limited by projections 367 secured to the bars and engageable with adjustable stops 370 depending from table top 113 (Fig. 1).

At their left end the bars 366 are beveled as shown in Fig. 25 for engagement by cam surfaces 356, and are chamfered at 371 as shown in Fig. 31. The clevises 365 are sufficiently loose with respect to the bell cranks 362, and are sufficiently long to permit the bars 366 to be lifted from the position indicated in the drawings by engagement therewith of the sloping surfaces 357 of the cam blocks 354 and 355 as the blocks move back and forth. In being simultaneously lifted and reciprocated each bar rides between a pair of rollers 372 (Fig. 31) rotatable on pins 373 fixed in the support bar 369. At their lower ends the pins are fixed in a retaining plate 375 secured underneath bar 369, which plate also supports the rollers 372.

Compressed air in the hydraulic system is alternately admitted behind the pistons 325 and 326 causing reciprocation thereof together with the blade 344 and cam blocks 354 and 355. Movement of the blade forces packages from the belt 281 alternately to the side belts 291 and 292. Inward movement of the cam blocks 354 and 355 forces the bars 366 toward the bell-crank members 362 and shifts the filled packages inwardly beyond the positioning stops, permitting the belts 291 and 307 to remove the filled packages. The admission of the compressed air to the cylinder 324 is synchronized with the operation of the main control valve of the machine to effect movement of the pistons in the cylinder whenever a package is filled.

If, due to interference with the flow of empty cartons to the machine or other cause resulting in failure of a carton to be positioned below one or the other of the filling nozzles, or in the event the sides of a carton are crushed and the same is unfit for filling, it is desirable to stop the machine until the difficulty is remedied. This result is accomplished by what hereinafter will be sometimes termed the "no carton—no fill" assembly now to be described.

Adjacent the path of travel of the cartons on the belts 291, 292 (Fig. 25) is a pair of fingers 381 (Fig. 27), the zone of operation of the fingers being in the space normally occupied by the cartons being filled. When in such position the cartons abut fixed stops 382—382 carried by a convenient one of the brackets 312.

The fingers 381 are part of bell crank levers 384 rotatable in bearings 385 fixed to the table top 113. The other arm 386 of each lever carries an adjustable operating button 387. Carried below the table top 113 is a pair of angularly disposed cylinders 388 and 388a each enclosing a plunger 389 and 389a normally urged outwardly of the cylinder by springs 391. Each plunger is reduced in cross section to pass outwardly of the cylinder and terminates in a head 392 adapted to be engaged by the buttons 387. The cylinders 388, 388a and plungers 389, 389a constitute air control valves.

Plungers 389, 389a operate to interrupt or permit air flow between ports 395 and 396 and 395a and 396a respectively, it being noted that ports 395 and 395a are interconnected by tubing 397. Travel of plungers 389, 389a is gauged by adjustable stops 398 threadedly engaged in the end of cylinders 388 and 388a. Rocking movement of levers 384 is limited on return stroke by a fixed stop 401 secured underneath table top 113, and engaged by buttons 387.

Unless the plungers 388 and 388a are maintained in inner position due to the fingers 381 being held in inner position by the packages in filling position, the compressed air system will be shut off, preventing further operation of the machine.

Now referring to diagrammatic Fig. 33, the pneumatic system is shown in its entirety, the numerals, in so far as possible, being the same as in the figures previously treated. Air under a pressure of approximately 80 pounds per square inch from any suitable compressor enters from the line 410 (Figs. 2 and 5), passes through a conventional filter 411, pressure regulator 412 equipped with a gauge 413, through a lubricator 414 and thence through conduit 415 (Fig. 33).

Conduit 415 feeds into a three-way cock 416, the rotor R, of which includes the usual arcuate channel, shiftable upon operation of the valve handle 417 to the full (off) or dotted line (on) positions shown in Fig. 32. In the "off" position the valve 416 is connected to exhaust via conduit 419 (Figs. 2 and 4). In the "on" position the valve 416 is connected to the pair of cylinders 154 (Fig. 12) by way of conduit 421 and port 165. Vacuum breaking for cylinders 154 is effected through port 175 also connected to conduit 419.

A branch 423 of conduit 421, actually connected to port 168 but for clarity shown out of position in Fig. 32, supplies air to port A of the four-way valve 59 through another branch 424. A conduit 426 connects port D of the valve 59 to a speed control valve 427 of conventional form for controlling the flow of air to the rear end of the cylinder 324. A conduit 428 extends from valve 427 to port 319 of cylinder 324. Port B of valve 59 is connected by conduits 431 and 432 to a second speed control valve 434, and from there a conduit 435 connects to front port 320 of cylinder 324.

Port B is also in connection with a conduit 437 via conduit 431 to feed the "no-drip" means heretofore referred to, and port D is connected, via conduit 426 and conduit 438 to the same means. Conduit 437 divides into two branches 441 and 442, connecting respectively with ports 222 of "no-drip" cylinders 213 and 213a. Likewise conduit 438 divides into two branches 443 and 444 leading to ports 223 of cylinders 213 and 213a.

From conduits 441 and 444 respectively branches 446 and 447 lead to ports 253 of "spreader" cylinders 243. Conduit 446 is cross-connected to port 252 of rear cylinder 243 by a conduit 448, and conduit 447 is cross-connected to port 252 of front cylinder 243 by a conduit 449.

Conduit 424 from port A of valve 59 also feeds the "no can—no fill" valves 388 and 388a in series by means of conduits 452 and 396. From valve 388a a conduit 453 feeds air control cylinders 65 and 65a by means of conduits 455 and 454, respectively, each of the latter entering both ports 82 and 83 as shown in Fig. 33.

Port C of valve 59 is merely open to atmosphere for exhaust.

*Operation*

As previously noted the functioning of the machine will be described on the assumption that rectangular, one-pound cartons of lard are being filled, although it will be understood that the machine is capable of handling cartons of other shapes and sizes whether formed of cardboard or other materials. If the container is of a type having no foldable top flap or liner, the "tissue spreader" mechanism is easily disabled so as not to interfere with the handling of other types of packages.

Assuming that a succession of empty cartons are in place on the belts 281, 291 and 292, there will be a package in position against each of the stops 382, and the top flaps of the packages and the tissue liners, if any, will be open. In Figs. 19 and 20, the carton is indicated at P and the liner at T. At any instant one pair of spreader rods 268 will be closed (full lines Fig. 20) and the opposite pair open (dotted lines Fig. 20). It will be understood that while Fig. 20 shows only one assembly there are two alike, positioned respectively at the front and rear of the machine. The carton will be so arranged beneath a pair of rods 268 that the package and liner will be properly opened by the pair of rods. As respects the opposite side of the machine, the rods 268 there will function similarly.

Assuming further that a supply of material, e. g. lard, in flowable form, fills the pipe 10, and that the valve 35 has just been moved to the position shown in Fig. 9 in which case the handle 53 will be positioned to the right, the lard will flow through the passage 32, rotor port 42, channel 43a and into the space behind the piston 17. By virtue of the high pressure under which the lard is being forced through pipe 10, say 400 pounds per square inch, the piston 17 is forced to the right (Fig. 1) against the stop 21. By suitable adjustment of the screw 22 through rotation of the handwheel 27 the space behind piston 17 may be made of predetermined volume, and hence measure an exact weight of lard upon each stroke of the piston. For materials of differing density, variation of the port-piston space will determine a desired weight of product per stroke. With the machine of the invention it is a simple matter to run a few test packages, weighing on a scale each time, and, by rotation of the screw 22, set the measuring piston 17 to an exact stroke. As mentioned, piston 17 is free acting and of dual function, measuring a batch upon each reciprocation, the screw 22a being adjusted independently of screw 22 to accommodate for any minor variations in the interior contour of the cylinder 11.

Forcing the product through the passage 43a imparts pressure to plunger 106a (Fig. 8) to move plunger 71a outwardly, and piston 95 which at that instant is in its right hand position, as shown in Fig. 8, is thereafter moved to the left, but only after a charge has been received in cylinder 16 to the left of piston 17. Such action is accomplished as follows: Opening of the starting valve 416 (Fig. 32, shown "off" in that figure) provides air pressure through conduits 423, 452, 396, 453, 455 to port 82 of the cylinder 65 (Fig. 8). Although plunger 389 is shown in Fig. 32 as blocking air flow, it will be pointed out later that such is only an emergency condition.

Accordingly, air through port 82 passes through passage 83, groove 76, apertures 77 and 78 and grooves 79 to force piston 71 inwardly of the machine to restore plunger 106 to position for its next operation. Such action is possible since pressure of the product against the inner end of plunger 106 gradually decreases due to discharge of the product to the package. When piston 71 is in its innermost position, groove 73 registers with port passage 86 and air pressure passes through port 82, aperture 86, groove 73 and apertures 101 and 102 (Fig. 23) to force piston 95 to the left, this being its position in Fig. 1. Exhaust of air ahead of piston 95 is via aperture 103, groove 72, and aperture 104 of cylinder 65a, the piston 71a having by this time taken an outward position under forcing of plunger 106a as aforesaid.

Movement of the piston 95 to the left operates the rocker 52 and shaft 37 to move the valve rotor 35 to its other position (shown in Fig. 1), with the channel 42 interconnecting passage 43a and port 119a, and channel 41 interconnecting channel 43 and port 119 in preparation for the other cycle of operation to be described.

With this arrangement, the piston 95 continuously reciprocates in the cylinder 93 rocking valve body 35 and thereby alternately forcing the material from opposite sides of the piston 17 through various passages to the discharge nozzles 197 and 197a. The rotor of valve 59 is connected to the valve body 37 and reciprocates therewith to control the compressed air system and thereby the operation of various parts of the machine, such as the no-drip pistons in the cylinders 213 and 213a, the spreader rods 268, the plate 344, the levers 363 for moving the filled cartons inwardly of the stops 283, and the valves controlled by the fingers 381.

In moving to the right, as pointed out, the measuring piston 17 displaces the material in the cylinder 11 through the passage 43, channel 41, port 119, passages 118 and 122 to within the aperture 141 of sleeve 132. At this time plunger 142 is in its downward position as a result of the previous cycle and is accordingly thrust upwardly to the position shown in Fig. 12 by the pressure of the material. From the space below the plunger 142 the material is forced through the orifices or slots 137 to the chamber 181.

The forcing of the semi-fluid lard or other compound being processed through the orifices 137 constitutes a form of homogenization. The homogenized product fills the chamber 181 from which it finds exit through the passage 188, nozzle 197 and nozzle piece 204 to the package P, the quantity of material delivered thereto having been precisely measured by the piston 17 and cylinder 11. Since piston 17 is free-floating in its stroke, the quantity measured thereby may be adjusted with micrometer precision by means of screw 22 and its handwheel 27, and the predetermined setting maintained by locking handle 31.

Of paramount importance is the maintenance of pressure on the products being delivered from the measuring cylinder through the orifices 137.

To effect proper homogenization plungers 142 and 142a are backed by pistons 153 and 153a working in cylinders 154, the latter in turn receiving air pressure from the line 415, through valve 416, conduit 421 and ports 165 and 166. Thus, plungers 142 and 142a are constantly under line air pressure, which is less than product pressure as provided by the exterior feeding pump, and therefore permits the product to reach the orifices 137 even with its pressure diminished by friction through the machine. After a charge has been forced through the orifices 137, the orifices are closed off by return of the plunger 142 or 142a to its lower position shown by the plunger 142a (Fig. 12). It will be obvious that return of the plungers is effected by air through ports 166, the exhaust below the pistons 153 and 153a being effected through ports 172, 174 and 175 to atmosphere.

The area of the orifices 137 utilized may be varied by limiting the upward movement of the plungers 142 and 142a. For that purpose stops 157 (Fig. 12) may be moved upwardly or downwardly by screws 159 and locked with handles 163.

Referring to Fig. 7 it will be seen that alternate rotation of the shaft 37 in opposite directions by means of the reciprocating piston 95 functions through link 58 to rock the four-way valve 59 from one of its positions to the other. In Fig. 33, valve 59 is shown in one of its positions and in Fig. 32 in the other thereof.

Following the filling of a carton it is desirable to cut off sharply the flow of material issuing from the nozzles 197 or 197a. Accordingly, I provide what I term a "no-drip" assembly. Referring to Figs. 2 and 12, it will be noted that movement of either of the two pistons 227 outwardly will create suction through the nipples 212 which, being in communication with the passages 188, will create a suction upon the mass of material therein. Thus any residual pressure against said material and the effect of gravity are circumvented and dripping from the nozzle pieces 204 avoided.

Activation of piston 227 outwardly of its cylinder is through the medium of spring 233 and the supply of air under pressure to the inner face of piston 228. Referring for illustration to the left hand cylinder 213a shown in Fig. 32, air pressure is applied thereto at the appropriate time through a path as follows: From line 415, conduits 421, 423 and 424, port A of valve 59 (now in the position of Fig. 33), passage H thereof, port B thereof, conduits 431, 437 and 441, port 222 to portion 225 of cylinder 213a to drive piston 228 outwardly. Thus piston 227 also moves by reason of rod 231. Meanwhile, exhaust occurs behind piston 228 through port 235. Simultaneously piston 227 of the right hand "no-drip" assembly is returned to inactive position against the action of spring 233 by air from conduit 442 entering port 222 and forcing pistons 227 and its thereto connected piston 228 inwardly, with exhaust port 235 breaking the vacuum.

When channel H of valve 59 is positioned to connect air pressure to conduit 441 as aforesaid, channel G interconnects port D to port C to provide an exhaust path for left hand cylinder 213a as follows: From port 223, through conduits 438 and 426 to port D, also for cylinder 213 through the foregoing path and port 223 and conduit 444.

It will be understood that when air control piston 95 is operated to the right during a succeeding cycle to change the setting of valve 35, the valve 59 will be switched to the position of Fig. 33, and feed and exhaust paths, replacing the first described exhaust and feed paths, respectively, will be established.

Similarly with respect to the measuring cylinder 16 and piston 17 together with the air control assembly of Fig. 8, a succeeding cycle will reverse the operations described, the functions of the right-hand half of the air control assembly being duplicated by those of the left-hand half, and vice versa. Alternate operations of these two halves not only reverse the position of the valve 59, but of the valve 35, permitting feed of material to the opposite face of the measuring piston 17. In brief, the machine is dual-acting in the fullest sense, and it is believed that the description given for one side will be obviously identical for the other side.

Operation of the tissue spreader assembly will now be detailed with particular reference to Figs. 19, 20 and 21. Assuming an empty carton has been brought into position beneath the nozzle 197a and that valve 59 is in the position of Fig. 32, air pressure is established through a path as follows: From line 415, conduits 421, 423 and 424 to port A, through channel H to port 4, through conduits 426, 438, 444, 447 and 449 to port 252. Consequently, piston 245, at that moment in its upper position, is moved downwardly with exhaust occurring through port 253, conduits 446, 441, 437 and 431, port B, channel G and exhaust port C.

Downward movement of piston 245 also moves member 255 and the rockers 265 and 266 therewith. Accordingly, rods 268, at this time constrained to closed position, enter the carton to an extent substantially indicated in Figs. 19 and 20. Immediately following such entry the rockers 265 and 266 strike the abutments 273 and each is rotated about the pin 264 to swing the arms outwardly (dotted lines in Fig. 20) to align the tissue substantially with the sides of the carton. It will be understood that the liner is of open box-like construction, so creased and folded that straightening of the sides is largely effective to straighten the ends. In any event, the function of the tissue-spreading mechanism is to insure at least that the tissue is not disposed in the path of the material issuing from the nozzle. Appropriate adjustment of the throw of rods 268 is effected by the screws 273, while a suitable idle position of the rods is achieved by adjustment of the screws 277.

Following the filling of the package compressed air is introduced below piston 245 through a path as follows (Fig. 32): from valve 416, through conduits 421, 423, 424, port A of valve 59, channel H, port 3 (the valve 59 having been rotated to the position of Fig. 33), conduits 431, 437, 441, 446, and port 253. Meanwhile, exhaust above piston 245 is via port 252, conduits 449, 447, 444, 438, 426, port 4, channel G and out exhaust port 2. Operation of the piston 245 in the other cylinder 243 is identical.

Feeding of the empty cartons seriatim and the delivery thereof alternately to each side of the machines will now be described with particular reference to Figs. 24, 25, 26, 28, 29, 30, 31, 32 and 33. Referring first to Fig. 24, the empty cartons including a tissue filler and with the top closing flap open are placed on the belt 281 by an operator or by other means not pertinent here. Due to the momentum imparted thereto by movement of the belt, each carton will be thrown against the stop rail 288. Assuming that the transfer blade 344 is in the position shown, actuation thereof will move the carton from the center of the machine onto the belt 292. Operation of the mechanism for so doing will now be detailed.

Turning to Fig. 25, rod 327 with which blade 344 is reciprocable is moved to its other position by admission of compressed air behind the piston 326. The path may be traced as follows (Fig. 33): from valve 416, through conduits 421, 423, 424, port 1 of valve 59, port 3, conduits 431 and 432, air speed control valve 434, port 320, to force piston 326 and hence blade 344 to its opposite position. The carton is thus transferred to belt 292 which, being in continuous motion, moves the carton to a stop against the bracket 382 and below the filling nozzle. Notwithstanding Fig. 25 shows the carton in position on the near side of the machine, it will be understood that it is being filled while the next carton is being brought into position on the far side of the machine in the manner just described. It will also be understood that a row of cartons may be resting on each of the belts 291 and 292, the filling and removal of a particular carton permitting the belt to carry the following carton into position against the stop 382.

Following the filling of a carton it is necessary to dislodge the same from abutment with the fixed stop 382 and permit the continuously moving belt 292 to carry the carton to the right hand end of the machine. Such action occurs substantially simultaneously with the delivery of an empty carton to the opposite belt 291. Thus, now that piston 325 is in the rear position as a result of the prior reciprocation of the rod 327 as described, air will be admitted behind piston 325 in the manner following: from valve 416, through conduits 421, 423 and 424 to port 1 of valve 59, through channel H now in the position of Fig. 33, port 4, conduit 426, control valve 427, conduit 428 and port 319 to drive piston 325 forwardly. Meanwhile, exhaust in front of piston 326 occurs over a path: port 320, conduit 435, valve 434, conduits 432, 431, port 3, channel G and port 2 to atmosphere.

Bar 351, being unitary with rod 327, also moves forwardly to cause cam surface 356 to actuate rod 366, bell crank 362 and arm 363, the latter rotating clockwise (Fig. 25). Accordingly, the filled package is forced inwardly a sufficient amount to clear stop 382 and the belt 292 carries a carton against the curved portion of the rail 311 (Fig. 5) and onto the take-off belt 307. The operator may remove the filled packages from the belt 307 or they may be delivered to a table for sealing and shipment. Following the active stroke of rod 366 the spring 368 returns the same to inoperative position.

In order that reciprocation of the bar 351 in either direction may be effected with a minimum of friction I prefer to clear the cams 354 and 355 past their respective rods 366 by means of the cam surfaces 357 (Figs. 25 and 30). Thus assuming bar 351 to be moving rearwardly the surface 357 slides beneath the extremity of rod 366 to lift the same a sufficient amount to enable cam 354 to pass thereunder, following which the spring 368, being inclined as in Fig. 26, restores the rod 366 to horizontal position. Referring to Fig. 31 it will be noted that guide rollers 372 are of sufficient length to permit upward and downward swinging movement of rod 366, while the clevis 365 is provided with a slot wide enough to prevent binding on lever arm 364. Adjustment of the stroke of rods 366 is effected by screws 370 abutting projections 367.

Inasmuch as the mechanism illustrated in Fig. 25 and just described is symmetrical the operation of those parts not mentioned is in alternate cycle with that cycle specifically detailed.

If, due to any misfunctioning of the means for feeding the empty cartons to filling position, a carton fails to arrive in filling position beneath a nozzle, it is desirable to provide means for interrupting delivery of the product. Otherwise a charge would issue from the nozzle, and, in the absence of a carton, would create a most undesirable condition. Accordingly, I have provided what, for convenience, may be termed a "no carton—no fill" assembly.

Turning to Figs. 25, 27, 32 and 33 and noting particularly the front side of the machine, a carton, when in proper position below the filling nozzle, is effective to swing its individual finger 381 about the pivot 385 to force plunger head 392 inwardly of the cylinder 388a against the pressure of the spring 391 to open the ports 395a and 396a. It will be noted that plunger 389a is provided with a circumferential recess for that purpose. Consequently, so long as ports 395a and 396a are in communication, or in so far as the rear half of the machine is concerned, ports 395 and 396, flow of air through conduit 452 (Fig.

32) is permitted, and the air control assembly may function as described. However, should a carton fail to be in filling position spring 391 may return the finger 381 to the position shown at the upper part of Fig. 25 and communication between ports 395 and 396 or 395a and 396a is interrupted. Thus air to conduits 453 and 450 is cut off and all functioning of the machine, which is under the influence of the air control assembly, ceases. The operator may cure the stoppage by placing a perfect carton in position adjacent the finger 381, which has just functioned in the described manner, and normal operation will continue.

While I have shown particular embodiments of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. A measuring and filling machine comprising a measuring chamber, a conduit for supplying flowable material under pressure to said measuring chamber, a pair of discharge passages each having a discharge outlet, supports for containers positioned to receive material from said outlets, means for forcing predetermined charges of material from said chamber, a valve operable to direct charges from said chamber alternately to said discharge passages, means adjacent said discharge outlets for preventing dripping of the material from an outlet after delivery of a charge, means adjacent said outlets for maintaining portions of the container separated for receiving a charge, said means and said valve being actuated by air under pressure, and an air supply system having control elements for effecting operation of said means in synchronization with said valve.

2. A measuring and filling machine comprising a measuring chamber, a conduit for supplying flowable material under pressure to said measuring chamber, a pair of discharge passages each having a discharge outlet, supports for containers positioned to receive material from said outlets, means for forcing predetermined charges of material from said chamber, a valve operable to direct charges from said chamber alternately to said discharge passages, means adjacent said discharge outlets for preventing dripping of the material from an outlet after delivery of a charge, an air supply system having control elements for effecting operation of said last means and said valve in synchronization, and means for shutting off the supply of air to render said machine inoperative whenever cartons are not in filling position, said last means being rendered inoperative by containers positioned to receive material from said outlets.

3. A measuring and filling machine comprising a measuring chamber, a conduit for supplying flowable material under pressure to said measuring chamber, a pair of discharge passages each having a discharge outlet, supports for containers positioned to receive material from said outlets, means for forcing predetermined charges of material from said chamber, a valve operable to direct charges from said chamber alternately to said discharge passages, means adjacent said discharge outlets for preventing dripping of the material from an outlet after delivery of a charge, means adjacent said outlets for maintaining portions of the container separated for receiving a charge, both said last means and said valve being actuated by air under pressure, an air supply system having control elements for effecting operation of said means in synchronization with said valve, and means for shutting off the supply of air to render said machine inoperative whenever cartons are not in filling position, said last means being rendered inoperative by containers positioned to receive material from said outlets.

4. A measuring and filling machine for use with a source of flowable material under substantial pressure, comprising a measuring chamber having a piston reciprocable therein, a valve, a supply conduit connecting said source to said valve, inlet passages connecting said valve with opposite ends of said chamber, a pair of discharge passages connected to said valve, said valve being operable to connect alternately one of said inlet passages to said supply conduit and the other inlet passage to one of said discharge passages, and means for operating said valve comprising a reciprocable piston associated with said valve, conduits for supplying fluid under pressure to opposite sides of said last piston, a valve in each of said conduits having a casing in communication with one of said inlet passages, valve members in said casing movable to open or closed position, and compressed air supply means tending to maintain said valve members positioned toward their respective inlet passages, each of said members being movable alternately to its other position by the pressure of said material thereagainst when its respective inlet passage is connected to said source of material.

5. A measuring and filling machine for use with a source of flowable material under substantial pressure, comprising a measuring chamber having a piston reciprocable therein, a valve, a supply conduit connecting said source to said valve, inlet passages connecting said valve to opposite ends of said chamber, a pair of discharge passages connected to said valve, said valve being operable to connect alternately one of said inlet passages to said supply conduit and the other inlet passage to one of said discharge passages, supports for containers positioned to receive material from said outlets, means for operating said valve comprising a reciprocable piston member associated with said valve, conduits for supplying air under pressure to opposite sides of said piston member, a valve in each of said air conduits having a casing communicating with one of said inlet passages, valve members in said casings movable to open and closed position, compressed air supply means tending to maintain said valve members positioned toward said inlet passages, each of said members being movable alternately to its other position by the pressure of said material thereagainst when its respective inlet passage is connected to said source of material, and shut-off means for preventing the flow of air to at least said air conduits, said shut-off means being rendered inoperative by containers positioned to receive material from said discharge passages.

6. The combination with a measuring and filling machine comprising a measuring chamber, a source of flowable material under pressure connected to said chamber, a pair of discharge passages each having an outlet, and means including a control valve for forcing predetermined charges of material from said chamber alternately to said discharge passages, of means for preventing dripping of material from said outlets after delivery of a charge therefrom, said means comprising a cylinder having a piston therein in communication with each of said discharge passages adjacent the outlets thereof, a compressed air system for supplying compressed air to opposite sides of said pistons for effecting movement of said pistons outwardly toward said passages or inwardly to suck material toward said chamber, said system having valve means for controlling the flow of the compressed air therein, said valve means being synchronized with the material forcing means to effect movement of each of said pistons inwardly when a charge of material has been forced from the outlet adjacent thereto.

7. The combination with a measuring and filling machine comprising a discharge passage having an outlet, means for forcing predetermined charges of flowable material periodically from said outlet, and means for supporting a package to be filled in filling position below said outlet, of means for maintaining portions of said package separated during filling comprising a pair of elongated fingers pivotally mounted, supporting means for said fingers normally maintaining said fingers substantially vertical with the lower ends thereof close together adjacent said outlet, means for lowering said supporting means from normal position to lower operative position, and means responsive to the moving of said supporting means to lower position for moving the lower ends of said fingers away from each other when substantially said fingers are moved to lowermost position, said lowering means being synchronized with said material forcing means to lower said fingers before each charge is forced from said outlet.

8. The combination with a measuring and filling machine comprising a measuring chamber, a source of flowable material under pressure connected to said chamber, a pair of discharge passages each having an outlet, means including a control valve for forcing predetermined charges of material from said chamber alternately to said discharge passages, and means for supporting a package to be filled under each of said outlets, of means for maintaining portions of each package separated during filling comprising a pair of elongated fingers, pivotally mounted vertically movable supporting means, said fingers being connected to said supporting means in a substantially vertical position with the lower ends thereof close together adjacent said outlet when the support is in upper position, stop means positioned to be engaged by and pivot said supporting means when in lower position to move the lower end of said fingers away from each other when said support is moved to substantially lowermost position, and fluid pressure means for moving said support, said last means being synchronized with said material forcing means to lower said fingers before each charge is forced from said outlet.

9. The combination with a measuring and filling machine comprising a measuring chamber, a source of flowable material under pressure connected to said chamber, a pair of discharge passages each having an outlet, means including a control valve for forcing predetermined charges of material from said chamber alternately to said discharge passages, and means for supporting a package to be filled under each of said outlets, of means for maintaining portions of each package separated during filling comprising a pair of elongated fingers, vertically movable supporting means, said fingers being connected to said supporting means in a substantially vertical position with the lower ends thereof close together adjacent said outlet when the support is in upper position, means for moving the lower ends of said fingers away from each other when said support is moved to substantially lowermost position, a compressed air system including control valve means and a piston actuated thereby for moving said support, said valve means being synchronized with said material forcing means to effect movement of said fingers to lower position before each charge is forced from said outlet.

10. The combination with a measuring and filling machine comprising a measuring chamber, a source of flowable material under pressure connected to said chamber, a pair of discharge passages each having an outlet, and means including a control valve for forcing predetermined charges of material from said chamber alternately to said discharge passages, of package feeding and positioning means comprising conveying means for feeding packages through said machine and in divided paths beneath said outlets, abutment members arranged in said paths adjacent each outlet for arresting movement of said packages when in filling position beneath said outlets, a movable pushing member arranged adjacent each path substantially opposite the outlets, actuating mechanism for moving said pushing members to force said packages to one side of each abutment to permit further movement by said conveying means, a compressed air system including control valve means for alternately operating said actuating mechanisms, said valve means being synchronized with said material forcing means to effect release of said packages from said abutment members after each package has received a charge from its outlet.

11. A measuring and filling machine for use with a source of flowable material under substantial pressure, comprising a measuring chamber having a piston reciprocable therein, a valve, a supply conduit connecting said source to said valve, inlet passages connecting said valve with opposite ends of said chamber, a pair of discharge passages connected to said valve, said valve being operable to connect alternately one of said inlet passages to said supply conduit and the other inlet passage to one of said discharge passages, means for operating said valve comprising a reciprocating piston associated with said valve, lines for supplying fluid under pressure to opposite sides of said last piston, valve means in each of said lines for controlling the supply of fluid to said last piston, means communicating with said inlet passages and responsive to the variations of pressure therein as said inlets are alternately connected to said supply conduit and said discharge passages for alternately opening and closing said valve means, and means for cutting off the supply of fluid to said last piston whenever cartons are not in filling position, said last means being rendered inoperative by containers positioned to receive material from said outlets 12. A measuring and filling machine comprising a measuring chamber, a conduit for supplying flowable material under pressure to said chamber, a discharge passage connected with said chamber, means for intermittently forcing predetermined charges of material from said chamber into said passage under high pressure, a barrier having a narrow elongated orifice therein positioned in said passage, a closure member biased to closed position blocking said orifice and movable to partially-open and completely-open positions unblocking said orifice partially or completely, and biasing means exerting substantial force on said closure member but less than the pressure exerted by said material in said passage whereby to retard movement of said closure member from closed position and minimize pressure variation in said material on the pressure side of said barrier.

13. A measuring and filling machine comprising a measuring chamber, a conduit for supplying flowable material under pressure to said chamber, a discharge passage connected with said chamber, means for intermittently forcing predetermined charges of material from said chamber into said passage under high pressure, a barrier having a narrow orifice therein positioned in said passage, a closure member normally biased to closed position tending to prevent the flow of material to said barrier, and movable to open position permitting access to said barrier, and biasing means exerting a substantial force on said closure member but less than the pressure exerted by said material whereby to minimize pressure variation of said material on the pressure side of said barrier.

14. A measuring and filling machine comprising a measuring chamber, a conduit for supplying flowable material under pressure to said chamber, a passage connected with said chamber, means for intermittently forcing predetermined charges of material from said chamber into said passage under high pressure, said passage having a portion in one side thereof provided with a longitudinally extending narrow orifice, a plunger in said passage movable between a position outwardly of said orifice and a position completely covering said orifice, means limiting the movement of said plunger, and biasing means exerting a substantially constant force on said plunger tending to maintain it in position completely covering said orifice, said biasing means force being less than that normally exerted by said material.

15. A measuring and filling machine comprising a measuring chamber, a conduit for supplying flowable material under pressure to said chamber, a passage connected with said chamber, means for intermittently forcing predetermined charges of material from said chamber into said passage under high pressure, said passage having a portion in one side thereof provided with a longitudinally extending narrow orifice, a plunger in said passage movable between a position outwardly of said orifice and a position completely covering said orifice, means limiting the movement of said plunger, and fluid under substantial pressure but less than the discharging pressure exerted upon the material in said passage applied to the outer end of said plunger for biasing said plunger to its position completely covering said orifice.

RONALD GEORGE TRIGGS.

REFERENCES CITED

The following references are of record in the file of this patent:

UNITED STATES PATENTS

| Number | Name | Date |
| --- | --- | --- |
| 1,007,358 | Joplin | Oct. 31, 1911 |
| 1,023,343 | Tremaine | Apr. 16, 1912 |
| 1,482,467 | Harrington | Feb. 5, 1924 |
| 1,555,008 | Harrington | Sept. 29, 1925 |
| 1,700,494 | Harrington | Jan. 29, 1929 |
| 1,804,772 | Hubbard | May 12, 1931 |
| 1,932,976 | Lamb et al. | Oct. 31, 1933 |
| 2,037,484 | Raymer et al. | Apr. 14, 1936 |
| 2,041,358 | Lidberg et al. | May 19, 1936 |
| 2,106,492 | Adams | Jan. 25, 1938 |
| 2,215,011 | McCoy et al. | Sept. 17, 1940 |
| 2,250,603 | Poole et al. | July 29, 1941 |
| 2,254,384 | Nowak | Sept. 2, 1941 |
| 2,266,979 | McIllvried | Dec. 23, 1941 |
| 2,354,087 | Raymer | July 18, 1944 |